(12) United States Patent
Perlot

(10) Patent No.: US 11,652,549 B2
(45) Date of Patent: May 16, 2023

(54) OPTICAL ANTENNA

(71) Applicant: Fraunhofer-Gesellschaft zur Förderung der angewandten Forschung e.V., Munich (DE)

(72) Inventor: Nicolas Perlot, Berlin (DE)

(73) Assignee: Fraunhofer-Gesellschaft zur Förderung der angewandten Forschung e.V., Munich (DE)

(*) Notice: Subject to any disclaimer, the term of this patent is extended or adjusted under 35 U.S.C. 154(b) by 0 days.

(21) Appl. No.: 17/011,679

(22) Filed: Sep. 3, 2020

(65) Prior Publication Data
US 2020/0403697 A1 Dec. 24, 2020

Related U.S. Application Data

(63) Continuation of application No. PCT/EP2018/055673, filed on Mar. 7, 2018.

(51) Int. Cl.
| | |
|---|---|
| *H04J 14/00* | (2006.01) |
| *H04B 10/112* | (2013.01) |
| *G02B 6/42* | (2006.01) |
| *H04B 10/118* | (2013.01) |
| *H04B 10/40* | (2013.01) |
| *H04L 5/14* | (2006.01) |
| *H04Q 11/00* | (2006.01) |

(52) U.S. Cl.
CPC ....... *H04B 10/1125* (2013.01); *G02B 6/4246* (2013.01); *H04B 10/118* (2013.01); *H04B 10/40* (2013.01); *H04L 5/14* (2013.01); *H04Q 11/0005* (2013.01); *H04Q 2011/0011* (2013.01); *H04Q 2011/0035* (2013.01); *H04Q 2011/0052* (2013.01)

(58) Field of Classification Search
CPC .. H04B 10/1125; H04B 10/118; H04B 10/40; G02B 6/4246; H04L 5/14; H04Q 11/0005; H04Q 2011/0011; H04Q 2011/0035; H04Q 2011/0052
See application file for complete search history.

(56) References Cited

U.S. PATENT DOCUMENTS

| | | |
|---|---|---|
| 6,690,888 B1 | 2/2004 | Keller et al. |
| 2002/0080455 A1 | 6/2002 | Maraglit et al. |
| 2003/0202796 A1 | 10/2003 | Yuichiro et al. |
| 2004/0238638 A1* | 12/2004 | Gofman ............ G06K 7/10811 235/462.32 |

(Continued)

*Primary Examiner* — Pranesh K Barua
(74) *Attorney, Agent, or Firm* — Novick, Kim & Lee PLLC; Jae Youn Kim

(57) ABSTRACT

An optical antenna may permit a duplex link formed by a transmit, Tx, beam towards a partner optical antenna and a receive, Rx, beam from the partner antenna. The antenna includes: a proximal path including a bidirectional waveguide for duplex propagation of the duplex link from a Tx source of the Tx beam and towards a receiver of the Rx beam; a distal path for a duplex propagation of the duplex link from/towards the partner optical antenna; a beam shaper positioned in the distal path to shape a duplex propagation pattern of the duplex link; and a controller controlling the beam shaper to adaptively shape the propagation pattern to enclose: a first position of the partner antenna at the transmission of the Rx beam; and a second of the partner antenna at the reception of the Tx beam.

19 Claims, 16 Drawing Sheets

(56) References Cited

U.S. PATENT DOCUMENTS

| | | | | |
|---|---|---|---|---|
| 2005/0285024 | A1* | 12/2005 | Eubelen | ................. G01S 7/486 250/221 |
| 2010/0104293 | A1 | 4/2010 | Nykolak | |
| 2012/0063142 | A1* | 3/2012 | Cameron | ............. G02B 26/005 362/277 |
| 2012/0308239 | A1* | 12/2012 | Sheth | ................ H04B 10/1125 398/131 |

* cited by examiner

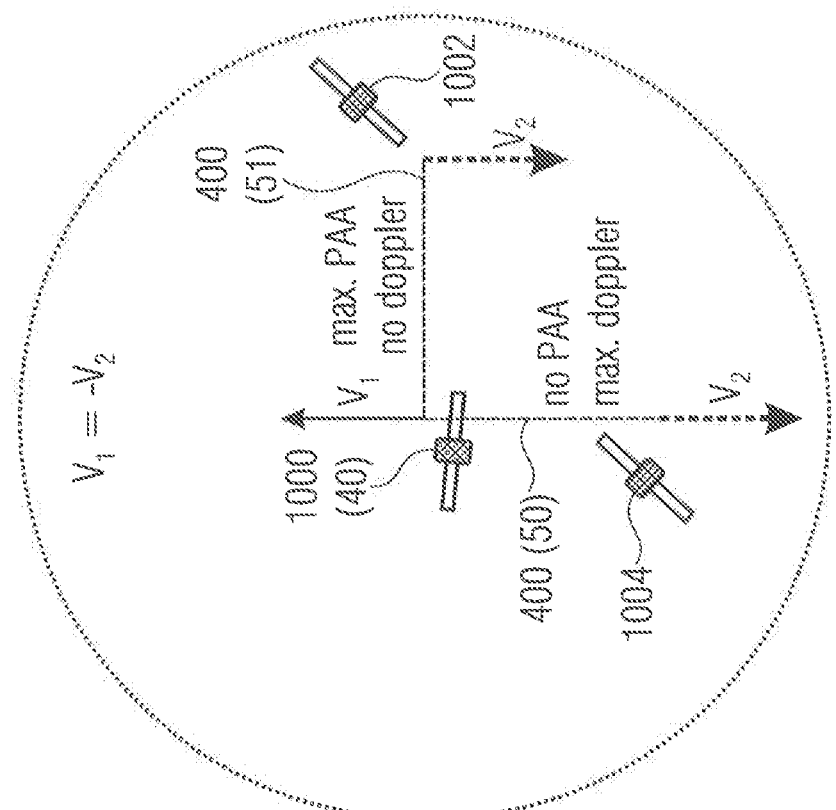
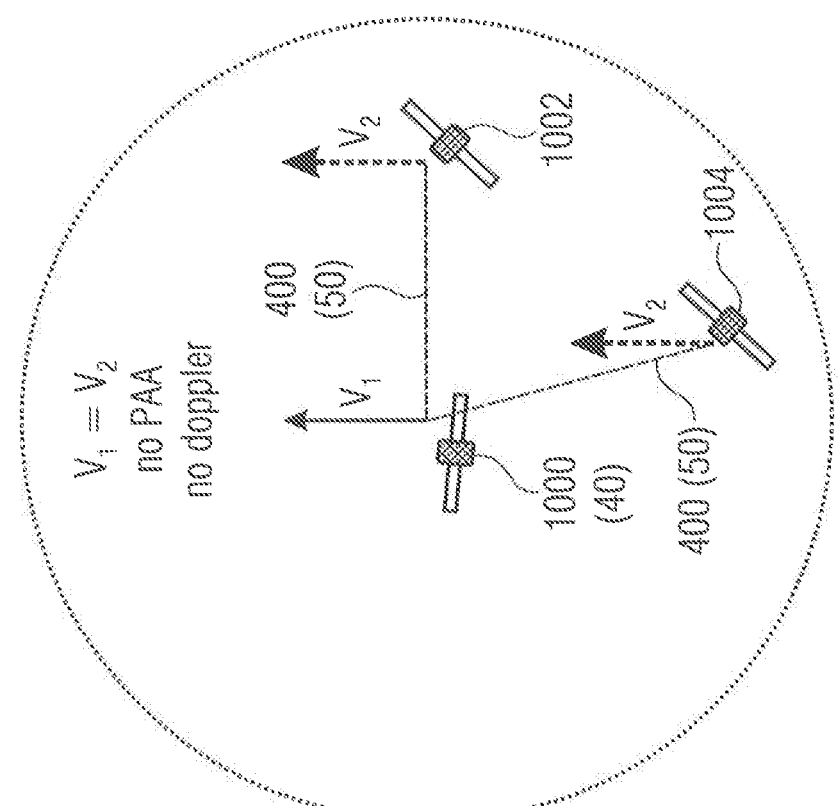
Fig. 10b
Fig. 10a

OPTICAL ANTENNA

1. CROSS-REFERENCES TO RELATED APPLICATIONS

This application is a continuation of copending International Application No. PCT/EP2018/055673, filed Mar. 7, 2018, which is incorporated herein by reference in its entirety.

2. BACKGROUND OF THE INVENTION

Technical Field

Examples relates to optical communications between optical antennas and related methods. Examples relate to waveguide-based duplexing with point-ahead angle (PAA) implementation.

Conventional Technology

FIG. 1 shows an example of optical communication between a first satellite 10 and a second satellite 12 according to conventional technology. The communications may be performed through optical beams, i.e., small bundles of optical rays which are sent, e.g. through an optical antenna, in the direction of the receiver. The satellites 10 and 12 may be in relative motion with respect to each other, expressed by the relative velocity V. The first satellite 10 transmits a first optical beam 14 to the second satellite 12 while the second satellite 12 transmits a second optical beam 16 to the first satellite 10. The beams 14 and 16 are in general not superposed with each other, as a consequence of the relative movement of the first satellite 10 For performing its transmission, the second satellite 12 shall guess the future position of the first satellite 12 to direct its beam; otherwise the information would be lost. In general terms, the second satellite 12 ideally is aware of the presence of a point-ahead angle (PAA), which is an angle between the received beam 14 and the transmitted beam 16. It is often possible to approximate the PAA to the value 2V/c (c being light velocity). The values of PAA vary with the distance and the speed of the satellites, but it is not infrequent to refer to angles between 0 and 80 µrad (microradians). (The dimensions in FIG. 1 may be exaggerated for the sake of explanation.)

FIG. 2 shows an example of optical antenna 20 according to conventional technology (e.g., mounted in the satellite 12 and useful to transmit the beam 14 and transmit the beam 16). The optical antenna 20 comprises at least a waveguide portion formed by a Rx waveguide 18 and a Tx waveguide 19. The optical antenna 20 comprises several other elements which are part of a free-space portion.

The optical antenna 20 comprises a Tx path and a Rx path. In the Tx path there are provided the Tx waveguide 19, a converging lens 21, a point-ahead mirror (PAM) 22, a polarization or dichroic beam splitter, BS, 23, a fine steering mirror 24, and a further telescope aperture 29. The elements 23, 22, 21, and 19 are grouped in the set 250, which refers to the Tx path which is different from the free-space Rx path, making the free-space path non-reciprocal. In the Rx path there are provided the telescope aperture 29, the FSM 24, the polarization or dichroic BS 23, a positioning BS 25, which bifurcates the Rx path between a measuring path (including a converging lens 26 and a quadrant detector 27) and a communication path (including a converging lens 28 and the Rx waveguide 18).

In order to obtain simultaneous, duplex communications, different polarizations and/or different wavelengths may be used. For example, the polarizations and/or wavelengths of beams 14 and 16 may be different from each other. The polarization or dichroic BS 23 is the element that duplexes the Rx path and the Tx path. As seen in the Tx path (in the Tx propagation direction from the Tx waveguide to the telescope), the polarization or dichroic BS 23 filters specific wavelengths (or polarizations) from the upstream side 23a to the downstream side 23b. As seen in the Rx path (in the Rx propagation direction from the telescope to the Rx waveguide), the polarization or dichroic BS 23 filters the received beam 14 from the upstream side 23b to the downstream side 23c. The result is that:

- in the interspace between the polarization or dichroic BS 23 and the FSM 24, both the beams 14 and 16 propagate, but at different (selected) wavelengths or polarizations;
- in the Tx path upstream (in the Tx propagation direction) from the Tx waveguide 19 to the polarization or dichroic BS 23, (ideally) only the transmitted beam 16 propagates;
- in the Rx path downstream (in the Rx propagation direction) from the polarization or dichroic BS 23 to the Rx 18, ideally only the received beam 14 propagates.

In general terms, the polarization or dichroic BS 23 is a passive optical element, whose structure is normally a cube comprising two triangular glass prisms. The side dimension may be close to 20 mm. As such, the polarization or dichroic BS 23 is not an "intelligent" component, and uniquely filters wavelengths or polarizations which are a priori determined.

This has led to the usefulness of defining different "antenna types" for different optical antennas, following the particular polarization or dichroic BS 23 that is mounted in a particular antenna. FIG. 3 shows an example of a so-called "type-1" antenna mounted on a first satellite 31, a so-called "type-2" antenna mounted on a second satellite 32, and another type-1 antenna mounted on a third satellite 33. A type-1 antenna can only transmit a beam at a first polarization (Pol.1) or wavelength ($\lambda$1) but only receive a beam at a second polarization (Pol.2) or wavelength ($\lambda$2) (e.g., in the Tx path, at the upstream side 23a of the BS 23, the beam is only at the first polarization or wavelength; in the Rx path, at the downstream side 23c, the beam is, at least in ideal conditions, only at the second polarization or wavelength). A type-2 antenna is complementary to the type-1 antenna: it only receives a beam at the first polarization (Pol.1) or wavelength ($\lambda$1) but only transmits a beam at the second polarization (Pol.2) or wavelength ($\lambda$2) (e.g., in the Tx path, at the upstream side 23a of the BS 23, the light is only at the second polarization or wavelength; in the Rx path, at the downstream side 23c, the light is at least in ideal conditions only at the first polarization or wavelength). Accordingly, even if two antennas of different type (e.g., 31 with 32; or 32 with 33) may simultaneously communicate with each other, antennas of the same type (e.g., 31 with 33) cannot bidirectionally communicate: the BS 23 of each antenna would not be able to discriminate the received beam from the transmitted beam as they would have the same wavelength or polarization.

In conventional technology, efforts have been made in the sense of trying to use a plurality of polarization or dichroic BSs (each BS discriminating different wavelengths or polarizations), which may be robotically substituted with each other in the same position. If we imagine, for example, an array of multiple polarization or dichroic BSs 23 displaced one after the other in the direction exiting from the plane of FIG. 2, we may conceive an automated mechanism which places a selected BS in the position of the BS 23. Hence, each antenna may become type-selectable. In other examples, it is possible to use rotational mechanisms to rotate the polarization or dichroic BSs 23 for changing between a type-1 and a type-2. However, the mechanisms for performing these operations are complicated, as they involve the use of precise electric motors, drives, actuators, positioners, and other elements with normally reduced reliability and which, when failed, may not be easily repaired. This is a major concern for narrow and uninhabited environments such satellites, where maintenance on the fly is not possible.

Also the effects of the power consumption that may be used by the actuators positioning elements such as the polarization or dichroic BSs 23 are to be taken into account.

With reference to FIG. 2, the FSM 24 permits to finely position the received beam 14 and the transmitted beam 16 (e.g., between a first position, indicated by a continuous line, and a second position, indicated by a dotted line). Notwithstanding, the beams 14 and 16, despite being represented in FIG. 2 as being coincident from aperture 29 to BS side 23b, actually take slightly different angles, as they need to be directed according to different directions (e.g., with a PAA which may be e.g., 80 μrad). The PAM 22 may be rotated (e.g., around an axis exiting from the plane of FIG. 2) in accordance with the satellite positional data and/or the PAA. Accordingly, the direction of the transmitted beam 16 differs from that of the received beam 14 in such a way to permit the second satellite 12 to point to the first satellite 10.

Such an operation is not easily performed, however. At first, also the rotation of the PAM 22 may use non-straightforward mechanisms, which tend to reduce reliability of the antenna.

Further, with reference to FIG. 1, for the control devices of the second satellite 12, it is not extremely straightforward to actually guess the position of the first satellite 10 and to finely transmit the second beam 16 in the direction at which the telescope aperture of the antenna of the first satellite 10 will be positioned. In fact, while the estimated satellite motion is also subjected to errors (pointing errors such as calculation errors, measurement errors, resolution errors, etc.), the beams shall have a pattern with reduced thickness (the thickness being, for example, a diameter of the cross section of the beam perpendicular to its trajectory) for the sake of decreasing the propagation loss. Therefore, an easy and reliable pointing of the beam comes at the expenses of power coupling efficiency, while the increase of efficiency tends to involve high pointing precision.

The above notwithstanding, it is also advantageous to reduce the bulkiness of the equipment, both for the purposes of increasing simplicity and for that of reducing the costs. Therefore, the option of using, in one single satellite, a Rx antenna different from a Tx is normally discarded.

In general terms, the reduction of the number of bulky components and mechanical parts is appreciated for optical antenna in satellites. In an antenna such as that of FIG. 2, however, the different optical paths, implied by the use of the polarization or dichroic BS 23, cause an unrequested redundancy of the optical devices, and in particular of voluminous ones. Notwithstanding, it is not possible to use one single converging lens, and it is recommendable to use two lenses 21 and 28, each associated to a waveguide (16, 14).

Also advantageous would be the use of one single waveguide instead of both the Rx waveguide 18 and the Tx waveguide. In order to achieve such a result, however, some optical means should be used, to mix the Tx beam upstream with the converging lens 21 and the Rx beam downstream with the lens 28. Moreover, by virtue of the different angles taken by the two beams 14, 16 as caused by the PAM 22, the two beams 14, 16 would notwithstanding result to have different angles. Therefore, even if it would be possible to make use of one single waveguide, it would be useful to rely on a multi-mode waveguide, in which beams at different angles can propagate. Multi-mode waveguides have reduced optical performance as compared to single-mode waveguides and are therefore normally discarded.

A difficulty is represented by the fact that, at the setup (pointing function), it is normally difficult to exactly retrieve the partner antenna (mounted on satellite 10), as it is difficult to recognize if the received light is the light directly obtained from the partner antenna. In order to cope with such an inconvenient, complicated calibration techniques have been developed. These calibration techniques are quite difficult to be implemented, as it is difficult to finely adjust the modes of the Tx waveguide 19 and the Rx waveguide 18. Basically, it is difficult to guarantee that, when the Rx waveguide receives light, also the light transmitted by the Tx waveguide 19 is actually received by the partner antenna.

3. SUMMARY

According to an embodiment, an optical antenna for a duplex link formed by a transmit, Tx, beam towards a partner optical antenna and a receive, Rx, beam from the partner antenna may have: a proximal optical path including a bidirectional waveguide for a duplex propagation of the duplex link from at least one Tx source of the Tx beam and towards at least one receiver of the Rx beam; a distal duplex optical path for a duplex propagation of the duplex link from and towards the partner optical antenna; a beam shaper positioned in the distal optical path to shape the duplex propagation pattern of the duplex link; and a controller to control the beam shaper to adaptively shape the duplex propagation pattern to enclose: a first partner antenna position of the partner antenna at the instant of transmission of the Rx beam; and a second antenna position of the partner antenna at the instant of reception of the Tx beam.

According to another embodiment, an optical antenna for a duplex link formed by a transmit, Tx, beam towards a partner optical antenna and a receive, Rx, beam from the partner antenna may have: a proximal optical path including a bidirectional waveguide for duplex propagation of the Tx beam from at least one Tx source and of the Rx beam towards at least one receiver; and a distal duplex free-space optical path for duplex propagation of the Tx beam towards the partner optical antenna and the Rx beam from the partner optical antenna, wherein the proximal waveguide path includes a non-reciprocal optical element including a first connector, a second connector, and a third connector, so as to direct: light input from the first connector to the second connector; and light input from the second connector to the third connector, wherein the first connector is configured to receive the Tx beam from at least one Tx source, the second connector is optically communicating with the bidirectional waveguide, and the third connector is configured to output the Rx beam.

According to yet another embodiment, a method may have the step of: controlling the shape of a duplex propagation pattern of a duplex link for an optical antenna to enclose: a first partner antenna position of a partner antenna at the instant of transmission of the Rx beam of the duplex link; and a second antenna position of the partner antenna at the instant of reception of the Tx beam.

Yet another embodiment may have a method for a duplex link formed by a transmit, Tx, beam towards a partner optical antenna and a receive, Rx, beam from the partner antenna, along: a proximal optical path including a bidirectional waveguide for duplex propagation of the Tx beam from at least one Tx source and of the Rx beam towards at least one receiver; a distal duplex free-space optical path for duplex propagation of the Tx beam towards the partner optical antenna and the Rx beam from the partner optical antenna; which method may have the step of: directing, through a non-reciprocal optical element including a first connector, a second connector, and a third connector: light input from the first connector to the second connector; and light input from the second connector to the third connector, wherein the first connector is configured to receive the Tx beam from at least one Tx source, the second connector is optically communicating with the bidirectional waveguide, and the third connector is configured to output the Rx beam.

According to still another embodiment, a non-transitory digital storage medium may have a computer program stored thereon to perform the inventive methods, when said computer program is run by a computer.

There is here disclosed an optical antenna for a duplex link formed by a transmit, Tx, beam towards a partner optical antenna and a receive, Rx, beam from the partner antenna, the optical antenna comprising:
  a proximal optical path including a bidirectional waveguide for a duplex propagation of the duplex link from at least one Tx source of the Tx beam and towards at least one receiver of the Rx beam;
  a distal duplex optical path for a duplex propagation of the duplex link from and towards the partner optical antenna;
  a beam shaper positioned in the distal optical path to shape the duplex propagation pattern of the duplex link; and
  a controller to control the beam shaper to adaptively shape the duplex propagation pattern to enclose:
  a first partner antenna position of the partner antenna at the instant of transmission of the Rx beam; and
  a second antenna position of the partner antenna at the instant of reception of the Tx beam.

According to an aspect, the controller may be configured to adaptively shape the duplex propagation pattern between:
  a first pattern; and
  a second pattern different from the first pattern,
  wherein the controller is configured to modify the duplex propagation pattern from the first pattern to the second pattern and/or vice versa on the basis of criteria on status of the optical antenna and/or the partner optical antenna.

According to an aspect, the controller may be configured to adaptively shape the duplex propagation pattern so that the area of the second pattern is greater than the area of the first pattern.

According to an aspect, the controller may be configured to adaptively shape the duplex propagation pattern so that at least one dimension of the second pattern is greater than the same dimension of the first pattern.

According to an aspect, the controller may be configured to adaptively shape the duplex propagation pattern so that the second pattern is more elongated than the first pattern.

According to an aspect, the controller may be configured to base the criteria at least on the point-ahead angle, PAA, between the optical antenna and the partner optical antenna, so as to be conditioned towards modifying the duplex propagation pattern:
  from the first pattern to the second pattern when the PAA is increased, and/or
  from the second pattern to the first pattern (50) when the PAA is reduced; and/or
  so as to elongate the duplex propagation pattern in the direction of extension of the PAA; and/or
  so as to reduce the elongation of the duplex propagation pattern in case of reduction of the PAA and/or to increase the elongation of the duplex propagation pattern in case of increase of the PAA.

According to an aspect, the controller may be configured to base the criteria at least on the pointing error, so as to be conditioned towards modifying the duplex propagation pattern:
  from the second pattern to the first pattern when the pointing error is reduced, and/or
  from the first pattern to the second pattern when the pointing error is increased, and/or
  so as to elongate the duplex propagation pattern in case of increased pointing error; and/or
  so as to reduce the elongation of the duplex propagation pattern in case of decreased pointing error.

According to an aspect, the controller may be configured to base the criteria at least on a pointing function and/or setup mode, so as to be conditioned towards modifying the duplex propagation pattern:
  from the second pattern to the first pattern at the conclusion of the pointing function and/or setup mode, and/or
  from the first pattern to the second pattern at the start of the pointing function and/or setup mode; and/or
  to elongate the duplex propagation pattern for the pointing function and/or setup mode; and/or
  to reduce the elongation of the duplex propagation pattern at a normal operation mode.

According to an aspect, the controller may be configured to shape the duplex propagation pattern to be more elongated in the direction of the segment between the first partner antenna position and the second partner antenna position and/or in the direction of the PAA.

According to an aspect, the controller may be configured to shape the duplex propagation pattern to have an elliptical shape, the major axis parallel or adjacent to the distance between the first partner antenna position and the second partner antenna position.

According to an aspect, the controller may be configured to shape the duplex propagation pattern to have a circular shape in case of the PAA being smaller than a predetermined threshold.

According to an aspect, the beam shaper may comprise a dispersing optical unit and a collecting optical unit,
  wherein the beam shaper is configured to modify the distance between the dispersing optical unit and the collecting optical unit under the control of the controller to modify the shape of the duplex propagation pattern.

According to an aspect, the beam shaper may comprise a dispersing optical unit and a collecting optical unit,
  wherein the beam shaper is configured to modify the distance between the dispersing optical unit and the collecting optical unit under the control of the controller to elongate the shape of the duplex propagation pattern.

According to an aspect, the beam shaper may comprise a dispersing optical unit and a collecting optical unit,
  wherein at least one of the dispersing optical unit and the collecting optical unit is a cylindrical lens.

According to an aspect, the beam shaper may comprise at least one rotatable optical unit with a non-circularly-symmetric shape adapted to modify the duplex propagation pattern in accordance with the orientation of the at least one rotatable optical unit,
wherein the beam shaper is configured to rotate the at least one rotatable optical unit under the control of the controller to modify the shape and/or orientation of the duplex propagation pattern.

According to an aspect, the beam shaper may comprise at least one rotatable optical unit with a non-circularly-symmetric shape adapted to modify the duplex propagation pattern in accordance with the orientation of the at least one rotatable optical unit,
wherein the beam shaper is configured to rotate the at least one rotatable optical unit under the control of the controller to rotate the duplex propagation pattern.

According to an aspect, the beam shaper may be placed before an attachment to an external telescope.

According to an aspect, the waveguide may be a duplex waveguide.

According to an aspect, the waveguide may be a single-mode waveguide.

According to an aspect, the proximal waveguide path may comprise a non-reciprocal optical element including a first connector, a second connector, and a third connector, so as to direct:
light input from the first connector to the second connector; and
light input from the second connector to the third connector,
wherein the first connector is configured to receive the Tx beam from at least one Tx source, the second connector is optically communicating with the bidirectional waveguide, and the third connector is configured to output the Rx beam.

There is also disclosed an optical antenna for a duplex link formed by a transmit, Tx, beam towards a partner optical antenna and a receive, Rx, beam from the partner antenna, the optical antenna comprising:
a proximal optical path including a bidirectional waveguide for duplex propagation of the Tx beam from at least one Tx source and of the Rx beam towards at least one receiver; and
a distal duplex free-space optical path for duplex propagation of the Tx beam towards the partner optical antenna and the Rx beam from the partner optical antenna,
wherein the proximal waveguide path comprises a non-reciprocal optical element including a first connector, a second connector, and a third connector, so as to direct:
light input from the first connector to the second connector; and
light input from the second connector to the third connector,
wherein the first connector is configured to receive the Tx beam (41 from at least one Tx source, the second connector is optically communicating with the bidirectional waveguide, and the third connector is configured to output the Rx beam.

According to an aspect, the optical antenna may be configured as examples above and/or below.

According to an aspect, the non-reciprocal optical element may be a circulator.

According to an aspect, the optical antenna may comprise:
a first Tx source(s) and a second Tx source(s) and/or a first receiver(s) and a second receiver(s), and
at least one optical switch to switch between the first Tx source(s) and the second Tx source(s) and/or between first receiver(s) and the second receiver(s),
wherein the first Tx source(s) and the second Tx source(s) are configured to generate light at different wavelength ranges and/or polarization ranges, and/or
the first receiver(s) and the second receiver(s) are configured to receive and/or detect light at different wavelength ranges and/or polarization ranges.

According to an aspect, the optical antenna may comprise:
a wavelength filter and/or polarization filter downstream to the at least one Tx source and/or upstream to the at least one receiver.

According to an aspect, the optical antenna may comprise:
a wavelength multiplexer and/or polarization multiplexer downstream to the at least one Tx source and/or
wavelength demultiplexer and/or polarization demultiplexer upstream to the at least one receiver, to separate different wavelengths and/or polarization ranges.

According to an aspect, the waveguide may be a single-mode waveguide, the antenna being configured to:
perform a pointing function and/or setup mode in which the Tx beam is transmitted;
check the detection of the Rx beam from the partner antenna;
determine the end of the pointing function and/or setup mode in case of detection of an Rx beam.

According to an aspect, the optical antenna may be configured to:
elongate or increase at least one dimension of the duplex propagation pattern of the duplex link in case of absence of detection of the Rx beam; and/or
reduce at least one dimension or render uniform the duplex propagation pattern in case of detection of the Rx beam.

There is also disclosed an optical communication unit comprising:
an optical antenna according to any of the examples above and/or below; and
a communication controller configured to:
control the at least one Tx source to generate Tx beams according to a bitstream to be communicated to the partner antenna;
decode a bitstream transmitted from the partner antenna on the basis of light decoded by the at least one receiver.

There is also disclosed a satellite comprising any of the optical communication units below and/or above and/or any optical antenna as above and/or below.

There is also disclosed a system comprising the optical antenna according to any of the examples above and/or below and the partner antenna, the partner antenna being configured as any of the examples above and/or below.

There is disclosed a method comprising:
controlling the shape of a duplex propagation pattern of a duplex link for an optical antenna to enclose:
a first partner antenna position of a partner antenna at the instant of transmission of the Rx beam of the duplex link; and
a second antenna position of the partner antenna at the instant of reception of the Tx beam.

According to an aspect, the method may comprise:
adaptively shaping the duplex propagation pattern between:
a first pattern; and
a second pattern different from the first pattern; and
modifying the duplex propagation pattern from the first pattern to the second pattern and/or vice versa on the basis of criteria on status of the optical antenna and/or the partner optical antenna.

There is disclosed a method for a duplex link formed by a transmit, Tx, beam towards a partner optical antenna and a receive, Rx, beam from the partner antenna, along:
a proximal optical path including a bidirectional waveguide for duplex propagation of the Tx beam from at least one Tx source and of the Rx beam towards at least one receiver;
a distal duplex free-space optical path for duplex propagation of the Tx beam towards the partner optical antenna and the Rx beam from the partner optical antenna;
wherein method comprises:
directing, through a non-reciprocal optical element including a first connector, a second connector, and a third connector:
light input from the first connector to the second connector; and
light input from the second connector to the third connector,
wherein the first connector is configured to receive the Tx beam from at least one Tx source, the second connector is optically communicating with the bidirectional waveguide, and the third connector is configured to output the Rx beam.

A method as above or below may use any of the equipment defined above and/or below.

There is disclosed a non-transitory storage device storing instructions that, when executed by a processor, cause the processor to perform any of the steps of or any of the methods above/or below and/or implement any of the components and/or any of the apparatus or systems above and/or below.

4. BRIEF DESCRIPTION OF THE DRAWINGS

Embodiments of the present invention will be detailed subsequently referring to the appended drawings, in which:

FIG. 4b shows a system comprising the optical antenna of FIG. 4a.

FIGS. 10a and 10b show different status for systems with optical antennas.

5. DETAILED DESCRIPTION OF THE INVENTION

Description of Examples

Figure 4A:
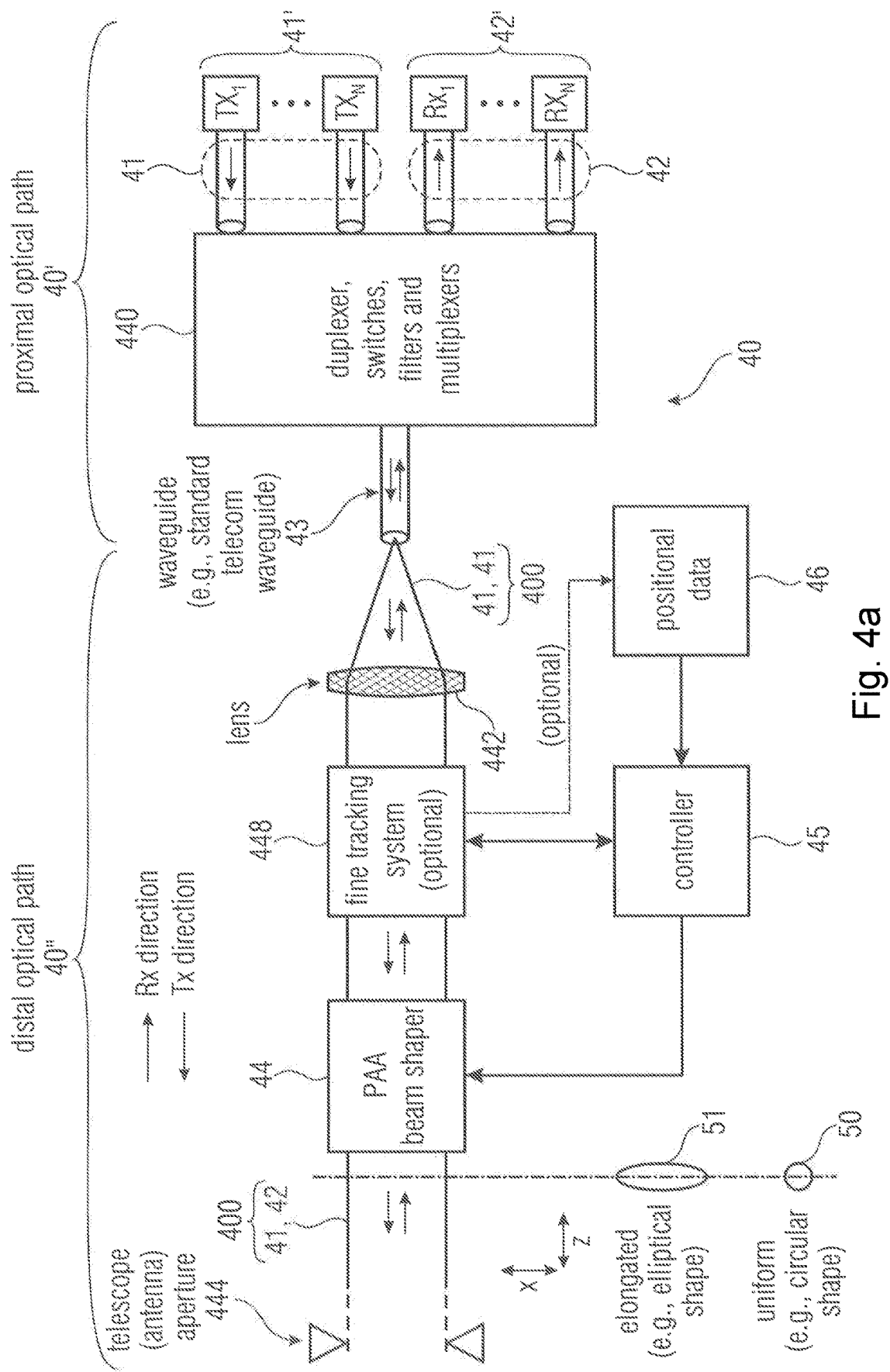
FIG. 4a shows an optical antenna according to examples above and/or below.

FIG. 4a shows an example of an optical antenna 40 for a duplex link 400 formed by a transmit, Tx, beam 41 towards a partner optical antenna and a receive, Rx, beam 42 from the partner antenna. The optical antenna 40 may be comprising:
a proximal optical path 40' including a bidirectional waveguide 43 for a duplex propagation of the duplex link 400 from at least one Tx source 41' of the Tx beam 41 and towards at least one receiver (or receptor) 42' of the Rx beam 42;
a distal duplex optical path 40" for a duplex propagation of the duplex link 400 from and towards the partner optical antenna;
a beam shaper 44 positioned in the distal optical path 40" to shape the duplex propagation pattern 50, 51 of the duplex link 400; and
a controller 45 to control the beam shaper 44 to adaptively shape the duplex propagation pattern 50, 51 to enclose:
a first partner antenna position of the partner antenna at the instant of transmission of the Rx beam 42; and
a second antenna position of the partner antenna at the instant of reception of the Tx beam 41.

The duplex link 400 may be formed by a transmit, Tx, beam 41 towards a part of the antenna, and a receive, Rx, beam 42 from the partner antenna.

The antenna 40 is also an example of an optical antenna for a duplex link 400 formed by a transmit, Tx, beam 41 towards a partner optical antenna and a receive, Rx, beam 42 from the partner antenna, the optical antenna 40 comprising:
a proximal optical path 40' including a bidirectional waveguide 43 for duplex propagation of the Tx beam 41 from at least one Tx source 41' and of the Rx beam 42 towards at least one receiver 42';
a distal duplex free-space optical path 40" for duplex propagation of the Tx beam 41 towards the partner optical antenna and the Rx beam 42 from the partner optical antenna;
wherein the proximal waveguide path 40' comprises a non-reciprocal optical element 90 including (with reference to FIGS. 7-9) a first connector 91, a second connector 92, and a third connector 93, so as to direct:
light input from the first connector 91 to the second connector 92; and
light input from the second connector 92 to the third connector 93,
wherein the first connector 91 is configured to receive the Tx beam 41 from at least one Tx source 41', the second connector 92 is optically communicating with the bidirectional waveguide 43, and the third connector 93 is configured to output the Rx beam 42.

FIG. 4a shows a distal optical path 40". The distal optical path 40" may be on free-space. The distal optical path 40" may guide the duplex link 400. The duplex link may be formed by:

the Tx beam 41 from at least one light source 41' towards the partner antenna (such as the antenna of a satellite of a base station); and the Rx beam 42, which may receive light (e.g., photons) from the remote antenna (such as the partner antenna) which is to be received by at least one receiver 42'.

The antenna 40 may comprise a proximal optical path 40'. The proximal optical path 40' may comprise, inter alia, a single-mode waveguide 43 (e.g., one single waveguide). As shown in FIG. 4a, light may be generated at one or more Tx sources 41' (e.g., photodiodes). Light may be directed to block 440, which may comprise equipment such as at least one duplexer, at least one switch, at least one filter, and/or at least one multiplexer. In the Tx direction (from the sources 41' to the aperture), a single-mode waveguide 43 may collect light generated by the sources 41'. The Tx beam 41 generated by the at least one Tx source 41' is transmitted through the waveguide 43. Notably, the waveguide 43 may be a directional waveguide, which may transmit in a duplex way the transmit beam 41 while propagating, on the Rx direction, another beam (e.g., the Rx beam 42).

In the Tx direction, the Tx beam 41 may be transmitted through the distal optical path 40". A collecting lens 442 may be, for example, placed downstream the waveguide 43 in the Tx direction. The collecting lens 442 may be the first element of the distal optical path 40" downstream to the proximal optical path 40'. For example, from the distal extremity of the waveguide 43 (e.g., optical fibre), the optical path may be in the free space (e.g., not within a waveguide). From the waveguide 43 to the lens 442, the rays of the Tx beam generated by the sources 41' may be expanded. In examples, the lens 442 may have the effect of rendering parallel, or approximately parallel, the rays of the Tx beam 41. The Tx beam 41 may be guided through the distal optical path 40" towards an aperture 444. The aperture 444 may be placed at the distal end of a telescope which is here not shown but may comprise an elongated (e.g., tubular cylinder guide . . . ) path along which the Tx beam may be transmitted to external entities. In examples, instead of a telescope, simply an aperture may be provided.

As can be seen from FIG. 4a, an Rx beam 42 (which is part of the duplex link 400) may be received from an external entity in the Rx direction (from the partner antenna into the antenna 40, and opposed with respect to the Tx direction). The Rx beam 42 may be irradiated so as to pass through the antenna aperture 444 and guided (e.g., along the telescope) through the distal optical path 40" to arrive to Rx receiver(s) 42'.

The distal optical path 40" may be a duplex path, along which the Tx beam 41:

is generated by the source(s) 41';
propagates through:
   the proximal optical path 40';
   the distal optical path 40";
   the free space after the aperture 444; and
reaches an external entity (partner antenna).
Simultaneously, the Rx beam 42:
is irradiated from the external entity;
is propagated through:
   the antenna aperture 444;
   the distal optical path 40",
   the proximal optical path 40'; and
reaches the Rx at least one receiver or receivers 42'.

In examples, the Tx beam 41 may be at a wavelength which is different from the wavelength of the Rx beam 42. In the same or alternative examples, the Tx beam 41 may have a polarization which is different from the polarization of the Rx beam.

In the Rx direction, the lens 442 may have the inverse function than that it has in the Tx direction for the Tx beam 41. For example, the Rx beam 42 (which may be understood as being formed by parallel or almost parallel rays upstream to the lens 442 in the Rx direction) may be collected so as to enter, for example, into the waveguide 43. In examples, while the Tx beam 41 is directed from the proximal optical path 40' to the distal optical path 40", the Rx 42 beam is directed from the distal optical path 40" to the proximal optical path 40' (and be directed towards the Rx receiver 42') simultaneously in the waveguide 43.

The waveguide 43 may be a single-mode waveguide, which is a waveguide which only permits beams to be propagated according to one single reflection angle. Single-mode waveguides have are more performing than multi-mode waveguides.

In the Rx direction, the Rx beam 42 may be propagated towards the at least one receiver or receivers 42' through the block 440, which may comprise at least one or a plurality of duplexers, and/or at least or a plurality of switches, and/or at least one or a plurality of filters, and/or at least one or a plurality of multiplexers.

Figure 4B:
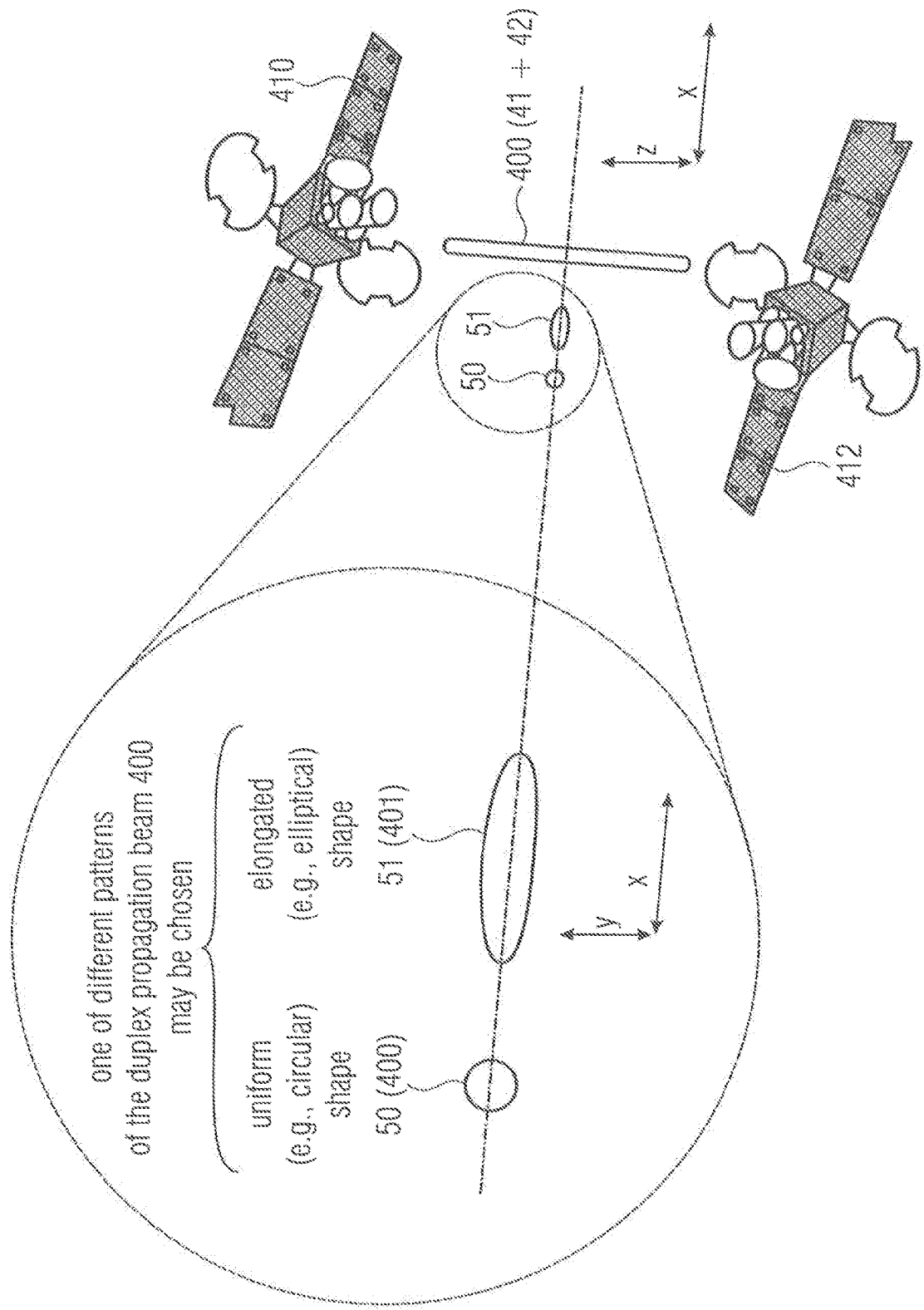

In examples, the optical antenna 40 may comprise a beam shaper 44 (such as a PAA beam shaper). The beam shaper 44 may be positioned in the distal optical path 40". The beam shaper 44 may shape the duplex propagation pattern of the duplex link 400. In examples, the beam shaper may force a first shape 50 of the pattern of the duplex link 400 (e.g., a uniform or circular shape, in some examples). The beam shaper 44 may, for example, shape the pattern of the link 400 to have a second shape 51 (e.g., an elongated or elliptical shape, for example). A multiplicity of patterns (which may also be different from the pattern 50 and 51) may also be chosen, in some examples. FIG. 4b shows an example of the duplex link 400 (along a propagation axis Z) which may have a selectively uniform (e.g., circular) and/or elongated (e.g., elliptical) shape between a first antenna (e.g., associated to a first satellite 410) and a second antenna (e.g., associated to a second satellite 412). As may be seen from FIGS. 4a and 4b, in the space, as it is possible to understand, the cross section orthogonal to the axis Z of the duplex link 400 may have a uniform (e.g., circular or otherwise radially symmetrical) shape 50 and/or an elongated (e.g., elliptical) shape 51. In other examples, only elongated shapes may be used (e.g., a more elongated shape and a less elongated shape). In examples, the uniform (e.g., circular) shape may be chosen for the cases in which the PAA is zero or very closed to zero.

An example is provided by FIG. 4b, which shows possible radiation pattern for reciprocal transmission with point-ahead angle (PAA).

Figure 5A:
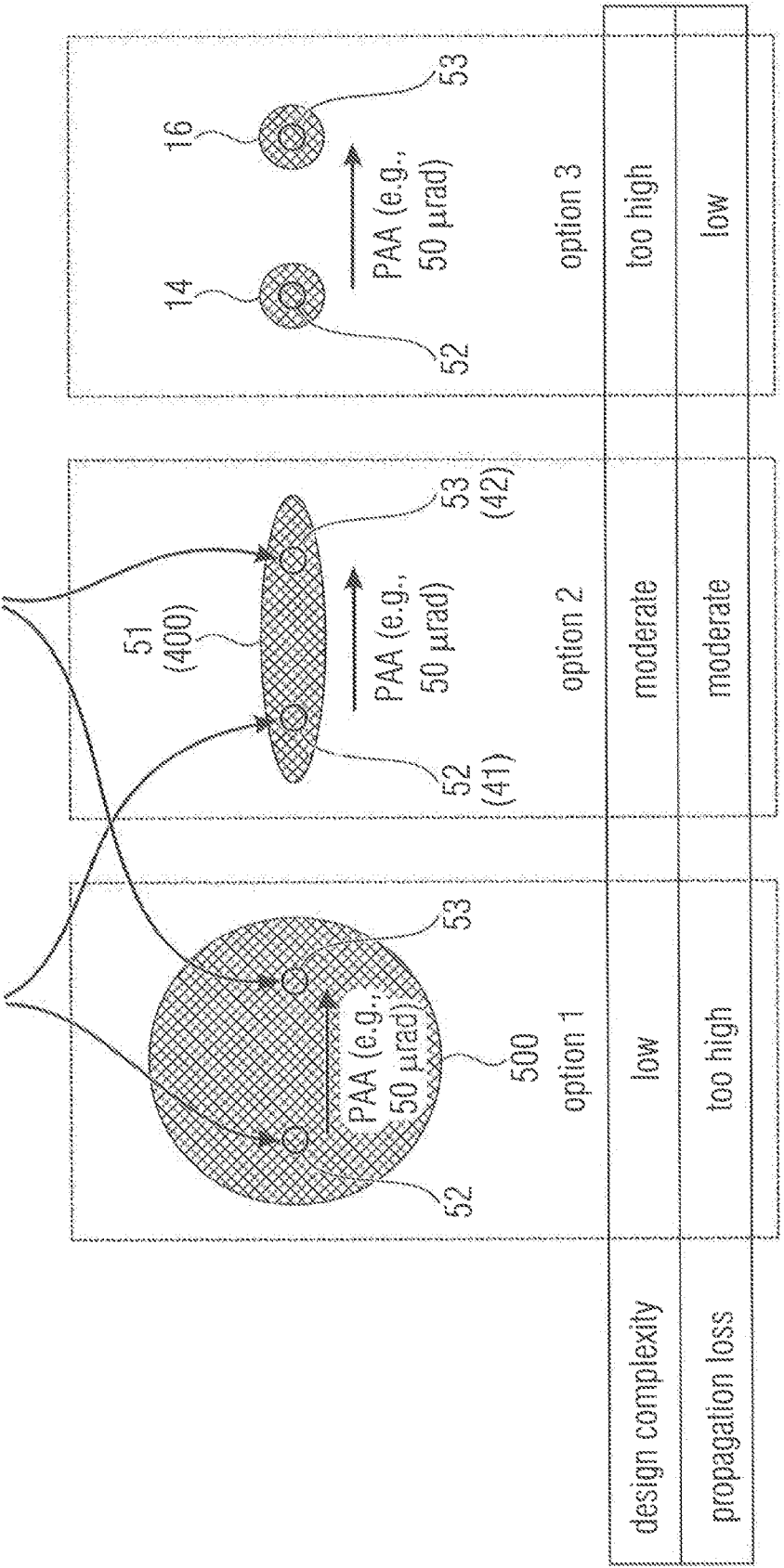
FIG. 5a shows different radiation patterns for bidirectional beams according to examples in comparison with other radiation patterns.

FIG. 5a shows different options for different shapes of the duplex link 400. These shapes are seen in a plane XY orthogonal to the direction of propagation Z of the duplex link 400.

FIG. 5a shows a first pattern 50 in which the duplex link is uniform (e.g., symmetric, such as circular).

With reference to Option 1, a first pattern 500 may be shaped so as to enclose the partner antenna (e.g., satellite) position at an instant $T_0$ at which the Rx beam 42 has been generated. The pattern 500 may also enclose the satellite position at $T_0+\Delta t$, which is the instant at which the partner antenna (e.g., mounted on a satellite) will receive the beam which is currently generated. Hence, the first pattern 50 may be shaped so that both the position 52 and 53 are in the scope of the duplex link 400. Therefore, we may understand that the optical antenna 40 transmits a Tx beam 41 towards an area which is broader than strictly needed (which would be only an area around the position 53). Further, the Rx beam 42 encompasses an area which is greater than the position 52 from which the photons are actually irradiated.

As can be seen from Option 1, in the time interval between the instants $T_0$ and $T_0+\Delta t$, the PAA has been of 50 μrad (but different angles may be possible). Hence, a duplex link actually encloses the whole PAA. If we imagine, for example, the PAA as an angle which has as vertex on the antenna 40 and is generated by two lines (a first line directed from the antenna 40 to the position 52 and a second line directed from the antenna 40 to the position 53), we may understand the PAA as an angle completely comprised within the scope of the duplex link 400. As explained in FIG. 5a, the design complexity of such a construction is low and the propagation loss is terms high.

FIG. 5a also shows Option 2, according to which the beam pattern of the duplex link 400 is a pattern 51 which may have, for example, an elongated shape (e.g., elliptical). The shape of the pattern 51 may encompass both the position 52 of the partner antenna at instant $T_0$ and the position 53 of the partner antenna at instant $T_0+\Delta t$.

Notably, the signal (among all the light irradiated by the partner antenna) actually received by the antenna 40 is the same in Option 1 and in Option 2. The same applies for the useful light (among all the light transmitted by the antenna 40) which actually reaches the partner antenna. In fact, both positions 52 and 53 are within the patterns 500 and 51 and this means that no transmission will be lost. However, as evident by comparing the areas of the patterns 500 and 51, Option 2 involves much less transmission power. Accordingly, with Option 2 the propagation loss is reduced with respect to Option 1, despite a slight increase in the design complexity.

Figure 1:
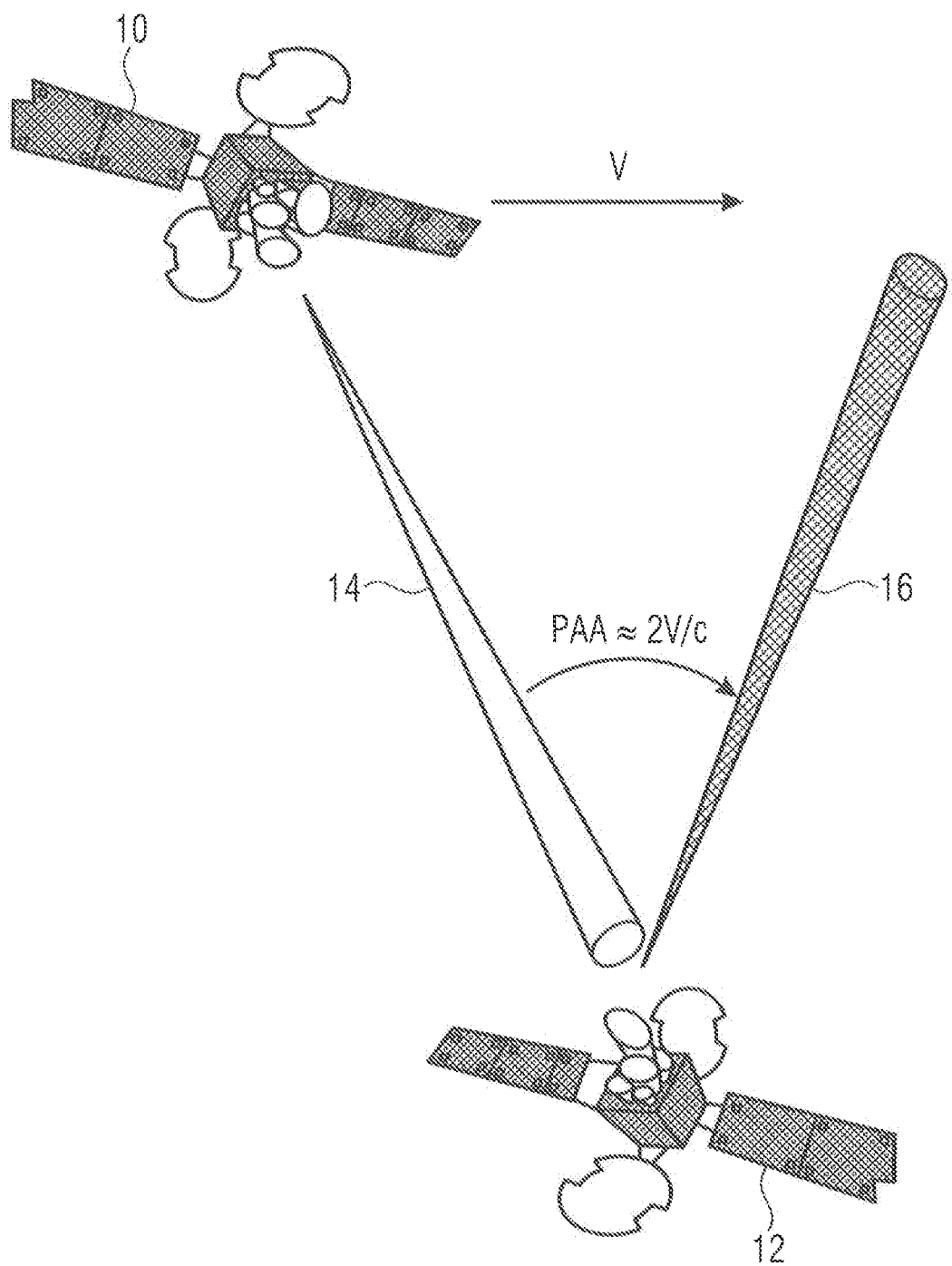
FIG. 1 shows a system according to conventional technology.

FIG. 5a also shows an Option 3, according to which a non-duplex link is used (e.g., as in FIG. 1). As can be seen, a Tx beam 14 is directed to the position 52, while a different beam 16 is directed to the position 53.

Notwithstanding, this option is too complicated to be carried out even though if its propagation loss would be reduced.

Figure 5B:
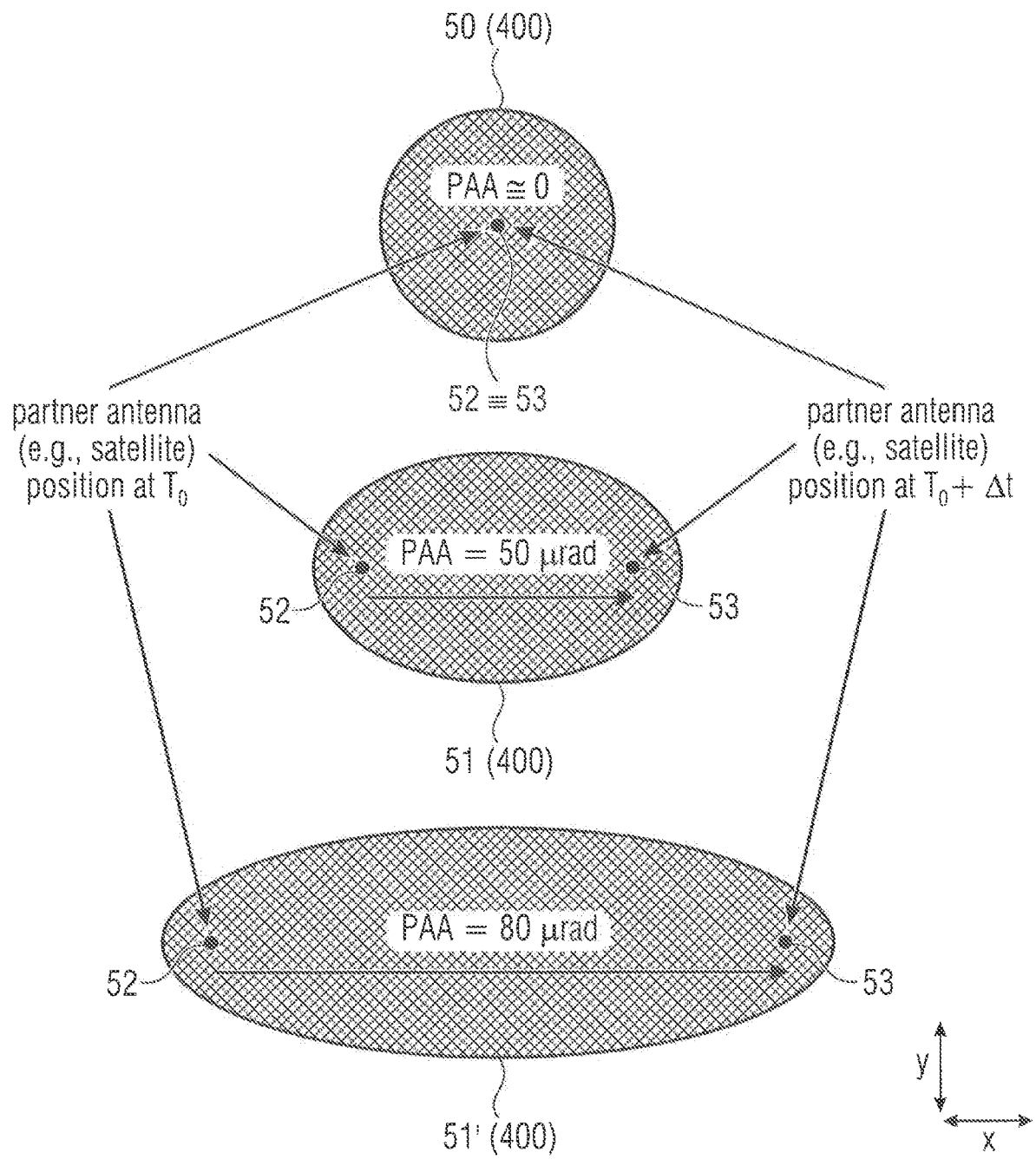
FIGS. 5b and 5c show different radiation patterns for bidirectional beams according to examples.

FIG. 5b shows three examples of patterns 50, 51, and 51', according to examples, for the link 400 under Option 2.

A pattern 50 may be obtained only where the PAA is 0 or approximately 0 (e.g., below a particular threshold, such as 5 μrad), e.g., when the positions 52 (at $T_0$) and 53 (at $T_0+\Delta t$) are basically coincident. For example, this is when the antenna 40 and the partner antenna are stationary with each other or when they only move along axis Z. The pattern 50 may be uniform in the plane XY, e.g. may have a radial symmetry (e.g., circular) around the propagation axis Z (orthogonal to FIG. 5b). The pattern 50 may be substantially rounded, e.g., with the coincident positions 52 and 53 approximately or perfectly at the center of a circle formed by the pattern 50.

The pattern 51 may be chosen when PAA increases (e.g., 50 μrad). In that case, the positions 52 and 53 are so far away that they would not be contained in the link 400.

Another pattern 51' may be chosen, in examples, in case the PAA is further increased (e.g., 80 μrad).

Basically, it is possible to elongate the pattern of the link 400 on the basis of the PAA, for example. The elongation may follow the direction of extension of the PAA (which scales with the relative speed of the partner antenna as observed by the antenna 40).

In examples, the greater the PAA, the greater the pattern (e.g., pattern 51' instead of pattern 51, and/or pattern 51 instead of pattern 50).

In addition or alternatively, it may be possible to increase the pattern (and/or to increase the elongation) when the pointing error is increased.

This may occur, for example, during a pointing function and/or setup mode, e.g., when the partner antenna is not in sight and its precise direction/position may be acquired. In order to increase the probability of finding (localizing) the partner antenna, the pattern may be increased (e.g., more elongated), e.g., from the pattern 50 to the pattern 51 or 51' (or from 51 to 51', for example).

Another example is when the distance between the antenna (40) and the partner antenna is decreased. In that case, the pointing error is in general increased. In order to reduce the probability of losing the partner antenna, the antenna (40) may increase (e.g., elongate) the pattern (e.g., more elongated), e.g., from the pattern 50 to the pattern 51 or 51' (or from 51 to 51', for example). In general, the elongation may be in a direction parallel to the direction of increase of the PAA (e.g., axis X), e.g., orthogonally to the axis Z of propagation of the link 400.

It is possible to define a plurality of patterns (more than three ones), which may be varied, for example, on the basis of criteria on the antenna (40) and on the partner antenna (e.g., criteria on the status). It is therefore proposed to shape the duplex link 400 between a first pattern and a second pattern (e.g., the first pattern may be 50 and the second 51 or 51'; the first pattern may be 51 and the second 51', and so on).

Figure 5C:
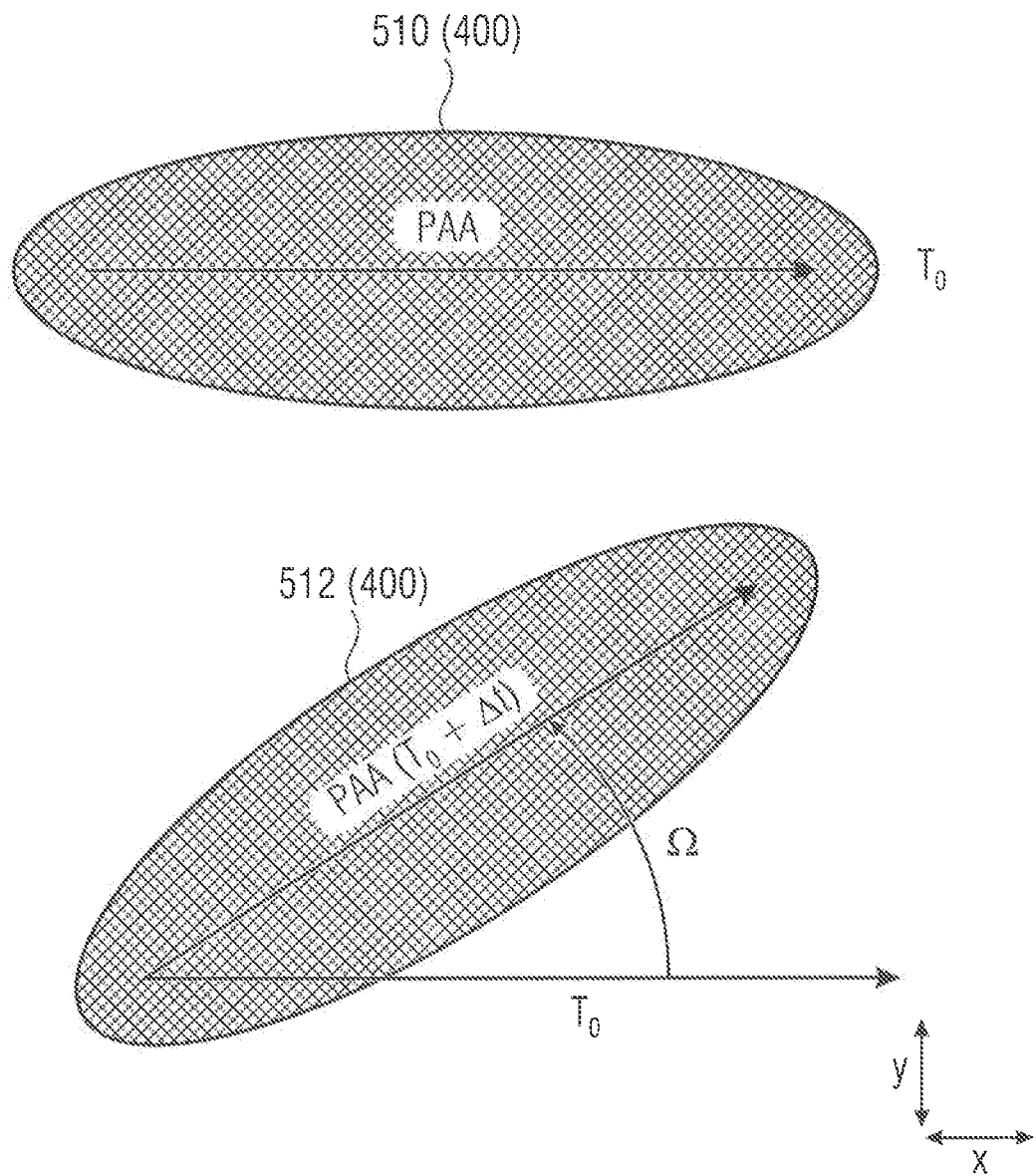

FIG. 5c shows another example of shaping between a first pattern 510 (at instant $T_0$) and a second pattern 512 (at instant $T_0+\Delta t$). The first pattern 510 may be elongated along a direction which is the direction of modification of the PAA. When the direction of the modification of the PAA is modified, a second pattern 512 may be chosen. For example, if the direction of the increase of the PAA is rotated (e.g., around the axis Z) of an angle Ω, it is possible to follow the evolution of the PAA by choosing the second pattern 512 (which is also rotated of Ω).

It is to be noted that elongating (as in FIG. 5b) the shape of the pattern in one single direction (e.g., X) is advantageous and more efficient than simply increasing the diameter of the pattern (as it would be with Opinion 1 of FIG. 5a). In fact, by intelligently elongating the pattern along one single direction, propagation loss is maintained low. A mere comparison between the pattern 51 of Option 2 and the pattern 500 of Option 1 in FIG. 5a permits to appreciate that Option 2 (as well as all the patterns shown in FIGS. 5b and 5c) may use a smaller shape than Option 1, without any loss in the information transmitted and/or received.

Figure 6:
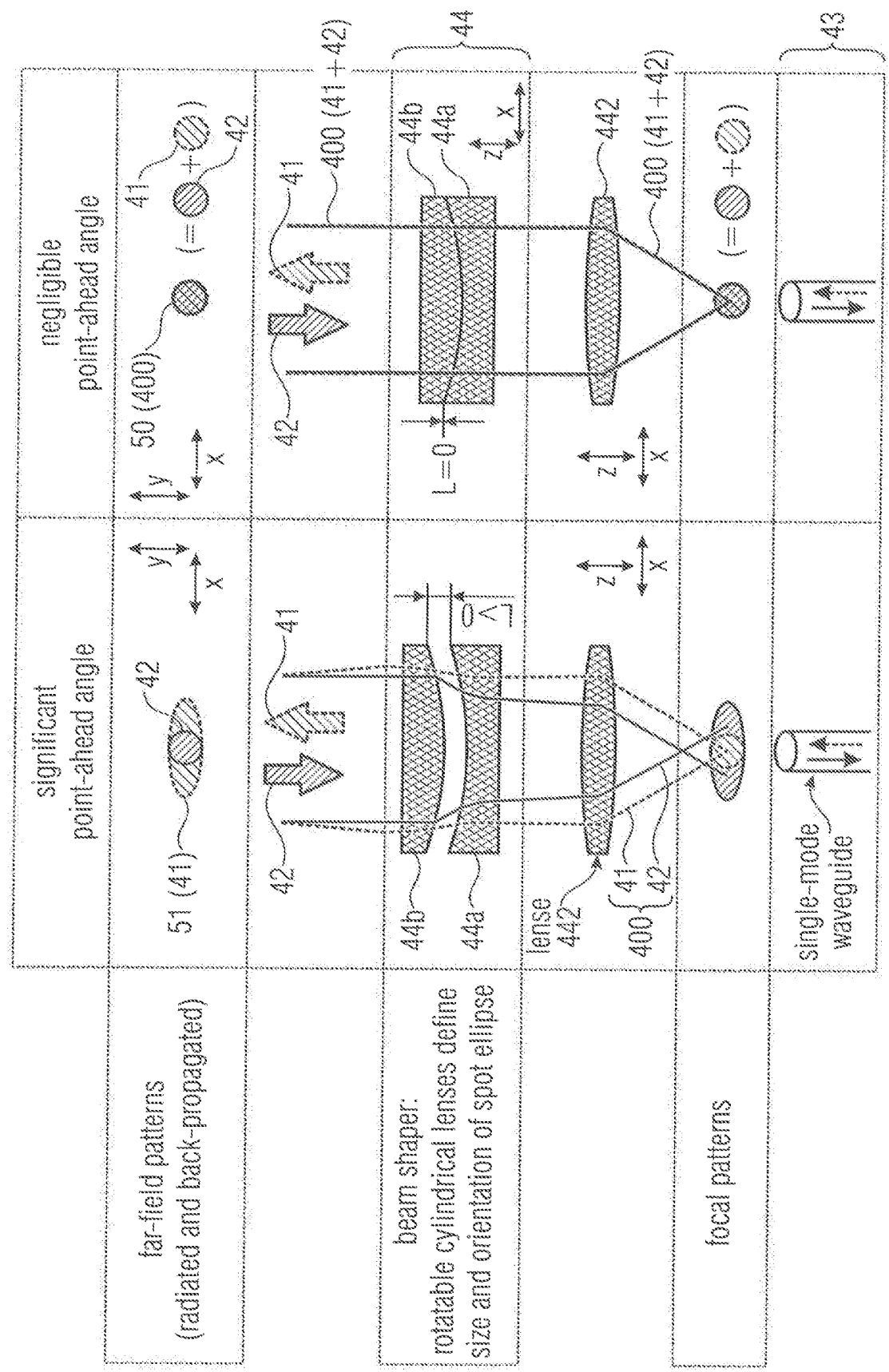
FIG. 6 shows a beam shaper according to examples above and/or below.

FIG. 6 shows an example of the beam shaper 44 which may be used to generate, and/or modify, and/or shape the pattern of the duplex link 400. The beam shaper 44 may comprise a dispersing optical unit 44a and/or a collecting optical unit 44b (e.g., as seen in the Tx direction, while having an opposite function in the Rx direction).

In examples, the surfaces of lenses 44a and 44b which are in front of each other (facing to each other) are non-symmetrical, e.g., cylindrical. The cylindrical shape may prevent, for example, from a radial symmetry. The cylindrical shape may be such that, by cross-sectioning the lenses 44a and 44b along planes parallel to the plane XZ along which the lenses 44*a* and 44*b* are shown in FIG. 6, the same shape of the cross section is obtained.

The shapes of the surfaces of lenses 44*a* and 44*b* may be complementary, in the sense that, when they are superposed to each other (e.g., when lens 44*a* abuts on lens 44*b*), they force the lenses to be simple "pieces of glass" (or other material) which has, e.g., no effect in shaping the duplex link 400. In examples, the lenses 44*a* and 44*b* (e.g., by virtue of the shape of their facing surfaces) may force an elongated shape of the beam pattern (e.g., to arrive at pattern 51). In examples, the elongation of the pattern may be controlled on the basis of the distance L between the lenses 44*a* and 44*b*. The greater L, the more elongated the shape.

As may be seen in FIG. 6, for L>0, an elongated pattern (e.g., in the X direction) may be obtained. In examples, a rounded (e.g., circular) pattern 50 may be obtained, for example, when L=0.

The beam shaper 44 may be configured to modify the distance L between the dispersing optical unit 44*a* and the collecting optical unit 44*b* under the control of an external controller to modify the shape of the duplex propagation pattern of the duplex link 400.

In examples, if the distance L is increased, the radial dimension of the pattern 50 or 51 is increased (e.g., the scope of the duplex link 400 is broader), while a reduction of the distance L reduces the elongation of the pattern 50 or 51. The example on the right in FIG. 6 permits to appreciate that, when the distance L is zero, a uniform (e.g., circular) shape is obtained.

As can be seen from FIG. 6, one distal surface of the lens 44*a* may be complementary to the shape of the lens 44*b*, so that, in case of the complementary surfaces abutting to each other, a uniform (e.g., circular) shape is caused.

As can be seen from FIG. 6, the particular shape of the lens 44*a* may cause the rays of the Tx beam 41 to diverge and the rays of the Rx beam 42 to become parallel. Further, the particular shape of the lens 44*b* may cause the rays of the Tx beam 41 to be collected or to become parallel, while the effect to the Rx beam 42 is to collect the back-propagating rays.

In examples, when the distance L is equal to 0, no effect or a negligible effect is caused on the optical shape of the propagation beams. When L is equal to 0, the effect of the lenses 44*a* and 44*b* can be basically the same as a normal "piece of glass" (or another material).

Another effect of the beam shaper 44 may be obtained by the shape of the lenses 44*a* and 44*b*. These lenses may have a shape which is not radially symmetrical and may cause the duplex propagation pattern to take different shapes (e.g., between the shape of the first pattern 50 and the shape of the second pattern 51). By controlling the rotation of the beam shaper 44 around the axis Z, different positions can be chosen which may generate different shapes, e.g. an elliptical shape and/or a circular shape. This effect is obtained by known optical techniques which permit to modify the shape of beams.

Notably, the lenses 44*a* and 44*b* both modify the shape of the incoming Rx beam 42 and of the transmitted Tx beam 41 in a duplex way, as can be seen by the focal patterns and the far-field patterns shown in FIG. 6. As can be seen from FIG. 6, a focal pattern of the beams 41 and 42 is associated to the distal extremity of the waveguide 43.

As shown in FIG. 4*a*, a controller 45 may adaptively shape the duplex propagation pattern of the duplex link 400 between the shape of the pattern 50 and the shape of the pattern 51 (other patterns are possible, for example, intermediate patterns). For example, the controller 45 may control the distance L between the lenses 44*a* and 44*b*. Hence, the controller 45 may be responsible for adaptively choosing the elongation (e.g., in direction X) of the duplex propagation pattern of the duplex link 400. The controller 45 may also control the shape of the duplex propagation pattern of the duplex link 400 by rotating the pattern as in FIG. 5*c*.

In examples, the rotation of the lenses 44*a* and 44*b* (e.g., around the optical axis Z) may cause the modification of the shape of the pattern of the duplex link 400. If the lenses 44*a* and 44*b* are rotated jointly to each other (or, however, so as to take the same orientations at any instant), the effects of the lenses 44*a* and 44*b* will be the same, apart from rotating the elongation around the axis Z. For example, the rotation of the lenses 44*a* and 44*b* may permit the rotation from the pattern 510 to the pattern 512 in FIG. 5*c*. Accordingly, it is possible to control the direction (orientation) of the elongation of the pattern of the duplex link 400 in a plane XY orthogonal to the optical axis. This control may be exerted by the controller 45 which may determine the orientation of the pattern on the basis of the direction of relative motion of the partner antenna, for example.

In examples, the beam shaper 44 is placed before an attachment to an external telescope (beam expander). In examples, the beam shaper 44 is completely independent from the telescope. In examples, the beam shaper 44 is capable of shaping and/or modifying the pattern of the duplex link 400 irrespective of the telescope. In examples, the beam shaper 44 is capable of shaping and/or modifying the pattern of the duplex link 400 even if the telescope is not moved. In examples, instead of a telescope a simple aperture may be provided.

Basically, the controller 45 may be configured to choose the most appropriate shape for the pattern of the duplex link 400, e.g., using a feedback-based solution, e.g., based on positional data or data associated to the status of the antenna 40 and/or of the partner antenna.

In examples, the controller 45 may exert its control on the basis of positional data 46. The positional data 46 may be either known a priori (e.g., on the basis of gravitational data), and stored in a storage unit, or obtained on the basis of a detector, such as a fine tracking system 448 (optional).

In examples, the controller 45 may be configured to adaptively shape the duplex propagation pattern so that the second pattern 51 is smaller than the first pattern 50.

In examples, the controller 45 may be configured to adaptively shape the duplex propagation pattern so that at least one dimension of the first pattern 50 is smaller than that of the first pattern 51.

In examples, the controller 45 may be configured to adaptively shape the duplex propagation pattern so that the second pattern 51 is more elongated than the first pattern 50.

In examples, the controller 45 may be configured to adaptively shape the duplex propagation pattern so that the second pattern 51 is more elongated than the first pattern 50 in one first direction X (e.g., the direction of the trajectory of the partner antenna as observed by the antenna 40) and/or to have the same elongation of the first pattern 50 in one second direction Y (e.g., the direction orthogonal to X and Z).

In examples, the controller 45 may be configured to adaptively shape the duplex propagation pattern so that the second pattern 51 (or 51') have at least one greater dimension (e.g., along axis X) than that of the first pattern 50 (or 51).

Figure 11:
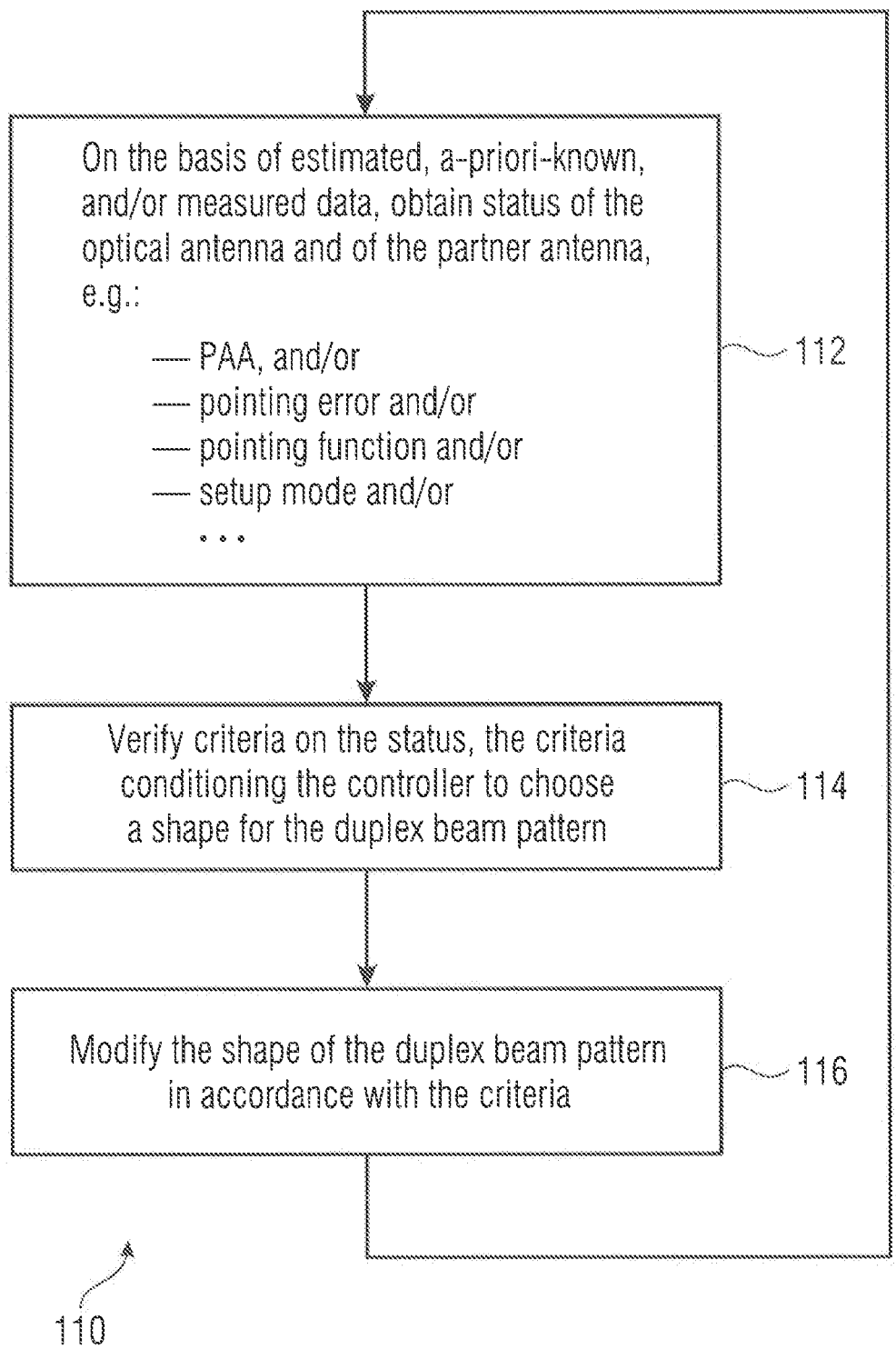
FIG. 11 shows a method of operating according to examples above and/or below.

A method 110 is shown in FIG. 11, which may illustrate operations of the controller 45 and/or of parts of the antenna 40. At block 112, the status of the optical antenna 40 and/or of the partner antenna may be acquired by the controller 45. The status may comprise, inter alia: pointing error (error in positioning, which may be bound to the probability of localizing the partner antenna) and/or pointing function and/or setup mode and/or PAA.

At step 114, the controller may verify criteria on the status. The criteria on the status may condition the controller 45 to choose the most appropriate shape for the pattern of the duplex link 400. At step 116, the controller 45 may actuate a control (e.g., by modifying parameters of the beam shaper 44, such as the distance between the lenses 44*a* and 44*b* and/or by rotating the lenses 44*a* and 44*b* around the optical axis). Hence, by obtaining information by verifying (checking) whether criteria are fulfilled, it is possible to shape the pattern of the duplex link 400 and to adapt it to the current status of the antenna 40 and of the partner antenna. Some examples of control are discussed here.

In examples, the controller 45 is configured to base the criteria at least on the point-ahead angle, PAA, between the optical antenna 40 and the partner optical antenna, so as to be conditioned towards modifying the duplex propagation pattern:

from the first pattern 50 (or 51) to the second pattern 51 (or 51', or 512) when the PAA is increased, and/or
from the second pattern 51 (or 51') to the first pattern 50 (or 51, or 510) when the PAA is reduced.

Accordingly, when the PAA increases (e.g., on the basis of an increased relative speed of the partner antenna), the shape of the duplex link 400 may be modified so that both the positions 52 and the position 53 are within the scope of the duplex link 400. When the PAA is reduced, it is possible to modify the shape of the duplex link 400 again, and, in case the positions 52 and 53 coincide, to have a little, circular pattern 50, for example.

It is in general advantageous to elongate the shape of the pattern of the duplex link 400 in the direction of the relative motion of the partner antenna (which is the direction according to which the PAA extends, and is parallel to axis X in FIGS. 4*b* and 5*a*). FIG. 10*a* represents a satellite 1000 carrying the present antenna 40 and a satellite 1002 on which the partner antenna is mounted. Both the satellites 1000 and 1002 move at the same speed $V_1=V_2$, and, therefore, PAA=0. For a communication in such a status, it is possible that the shape of the duplex link 400 may be extremely narrow and uniform (e.g., circular). The same applies to the satellite 1004 which moves at the same speed ($V_1=V_2$) of the satellite 1000. Therefore, even for the satellite 1004, the pattern of the duplex link 400 may be uniform and narrow (the communications of the satellite 1000 with the satellites 1002 and 1004 are not simultaneous: FIG. 10*a* is not meant as showing a real implementation but to only represent status of the antennas).

FIG. 10*b* shows the satellite 1000 (on which the antenna 40 is mounted) in communication to the satellite 1004. In this case, the satellite 1000 and the satellite 1004 are and/or move in the same line but with different versus. Therefore, even in this case the PAA is equal to 0. Accordingly, even in this case the shape of the pattern of the duplex link 400 may be narrow and uniform (e.g., circular).

The situation is different for the communication between the satellite 1000 and the satellite 1002: as the relative motion between the satellites 1000 and 1002 is according to antiparallel lines and with different speeds (in this case, $V_1=-V_2$), the PAA will be high and it will be useful to broaden the scope of the duplex link 400. For example, it could be possible to increase the pattern of the duplex link 400 (e.g., by elongating the pattern, e.g., from 50 to 51 or 51' or from 51 to 51'). Notably, an increased diameter of a circular pattern, as in Option 1 of FIG. 5*a*, would increase power loss, as a bigger area would be irradiated by the duplex link 400. However, it has been noted that, in this case, instead of the first uniform pattern 500, the second, elongated (e.g., elliptical) pattern 51 (or 51') may be chosen, provided that the second pattern 51 (or 51') also encloses the positions 52 and 53 of the satellite 1002. In this way, the propagation losses are reduced but the data received from the satellite 1002 and the data transmitted to it are notwithstanding provided.

In general terms, a criterion may therefore be that the greater the PAA, the more elongated the pattern of the duplex link 400, and/or vice versa. The pattern may be elongated in the direction of extension of the PAA, which is the direction on which the satellite 1002 moves (parallel to axis X in FIG. 5*b*).

The criterion may provide that, in case of rotation of the PAA around an axis Z (or in a plane XZ orthogonal to the axis Z), the duplex link 400 is rotated accordingly (e.g., by rotating the lenses 44*a* and 44*b*).

In examples, the controller 45 may be configured to base the criteria at least on the pointing error, so as to be conditioned towards modifying the duplex propagation pattern:

from a second pattern (e.g., 51 or 51') to a first pattern (e.g., 50 or 51) (e.g., from a more elongated to a less elongated or circular shape) when the pointing error is reduced, and/or
from a first pattern 50 (or 51) to a second pattern 51 (or 51') (e.g., from a less elongated to a more elongated or circular shape) when the pointing error is increased.

It has been noted, in fact, that when the pointing error risks to be big, a greater shape may be used. By virtue of the increased localization error, it is possible that the partner antenna is not exactly at positions 52 or 53 and, therefore, a broader and/or more uniform shape for the pattern may be advantageous. Notably, however, it is in general sufficient to simply elongate the shape in the direction of the extension of the PAA (e.g., from 51 to 51', for example, in the direction X), and not to increase the diameter of the pattern. Hence, even if the shape of the pattern is increased, the high propagation loss that would be obtained by increasing the diameter of the pattern (as in Option 1 of FIG. 5*a*) is not reached. Therefore, even if the pattern is elongated, efficiency is maintained.

According to examples, however, the distance between the positions 52 and 53 and the border (e.g., circumferential or perimeter or border or boundary line) of the pattern 50 and/or of the pattern 51 may be defined to be less than the error tolerance. In this case, the shape of the pattern may be defined so as to ensure a communication which is error-tolerant.

The errors in the direction Y in FIG. 5*b* (perpendicular to the axis X parallel to the extension of the PAA) are in general limited, in particular for high speed of the partner antenna (greater PAA). The errors in the direction of extension of the PAA (parallel to axis X) may be bigger. Therefore, at higher speeds, an elliptical shape (or another non-uniform shape) elongated in the axis X (direction of the relative speed) appears to be appropriate, as it is possible to precisely localize the positions 52 and 53 along the direction of the relative movement (X). When the satellites are close to each other and the uncertainty is high, a broader pattern may be chosen.

Additionally or alternatively, the controller 45 may be configured to base its criteria at least on a pointing function and/or setup mode, so as to be conditioned towards modifying the duplex propagation pattern between:

a more elongated shape (e.g., 51 or 51') when the pointing function and/or setup mode is to be started and/or a less elongated shape (e.g., 50 or 51) when the pointing function and/or setup mode has been concluded (e.g., in normal operation).

On the basis of a pointing function, it is possible to localize the partner antenna. This may be part of an initial procedure in which the position of the partner antenna is refined starting from a not accurate knowledge of the position of the partner antenna. For example, a rough localization may be based on a prior known data (e.g., based on gravitational data), for which a broad pattern for the duplex link 400 may be generated. For example, the first pattern 50 with an increased diameter may be chosen. Once the position of the partner antenna is localized (e.g., on the basis of data obtained by the fine tracking system 448), a pattern with reduced shape and/or with an elliptical shape may be chosen.

Hence, on the basis of the status of the optical antenna and of the partner antenna, it is possible to condition the beam shaper 44 to modify the pattern of the duplex link 400 according to the most advantageous shape among a plurality of possible shapes.

In particular, it is possible to choose between an increased dimension and a decreased dimension, e.g., on the basis of the probability of intercepting the position of the partner antenna and between a uniform (e.g., circular) shape and an elongated (e.g., elliptical) shape on the basis of positional data 46. The data 46 may be a priori known (e.g., derived from gravitational data of the satellites) and/or obtained by measurements.

The criteria discussed above may also be composed with each other and/or the controller 45 may decide that one or more criteria are more relevant than other criteria. The controller 45 may decide that some criteria are more important than other ones, e.g., on the basis of the status. For example, at the initial pointing a particular criterion may be chosen, while, after the localization of the partner antenna, a different criterion may be used.

The criteria may be composed with each other, e.g., by voting between different criteria. For example, by verifying three criteria it is acknowledged that two criteria condition the controller towards choosing the pattern 50 and one single criterion conditions the controller towards choosing the pattern 51, the controller 45 may finally decide to force the beam shaper 44 to shape the beam pattern to be as the patter 51. In examples, the voting may be weighted, in the sense that some criteria may be more important (e.g., more conditioning) than other criteria. In examples, instead of voting, a final rating is obtained on the basis of different state variables calculated from the different criteria. It is possible, for example, to sum different state variables derived from different criteria, and to compare the final rating with threshold(s). The comparison of the final rating with the threshold(s) will determine the pattern of the duplex link 400.

Figure 7:
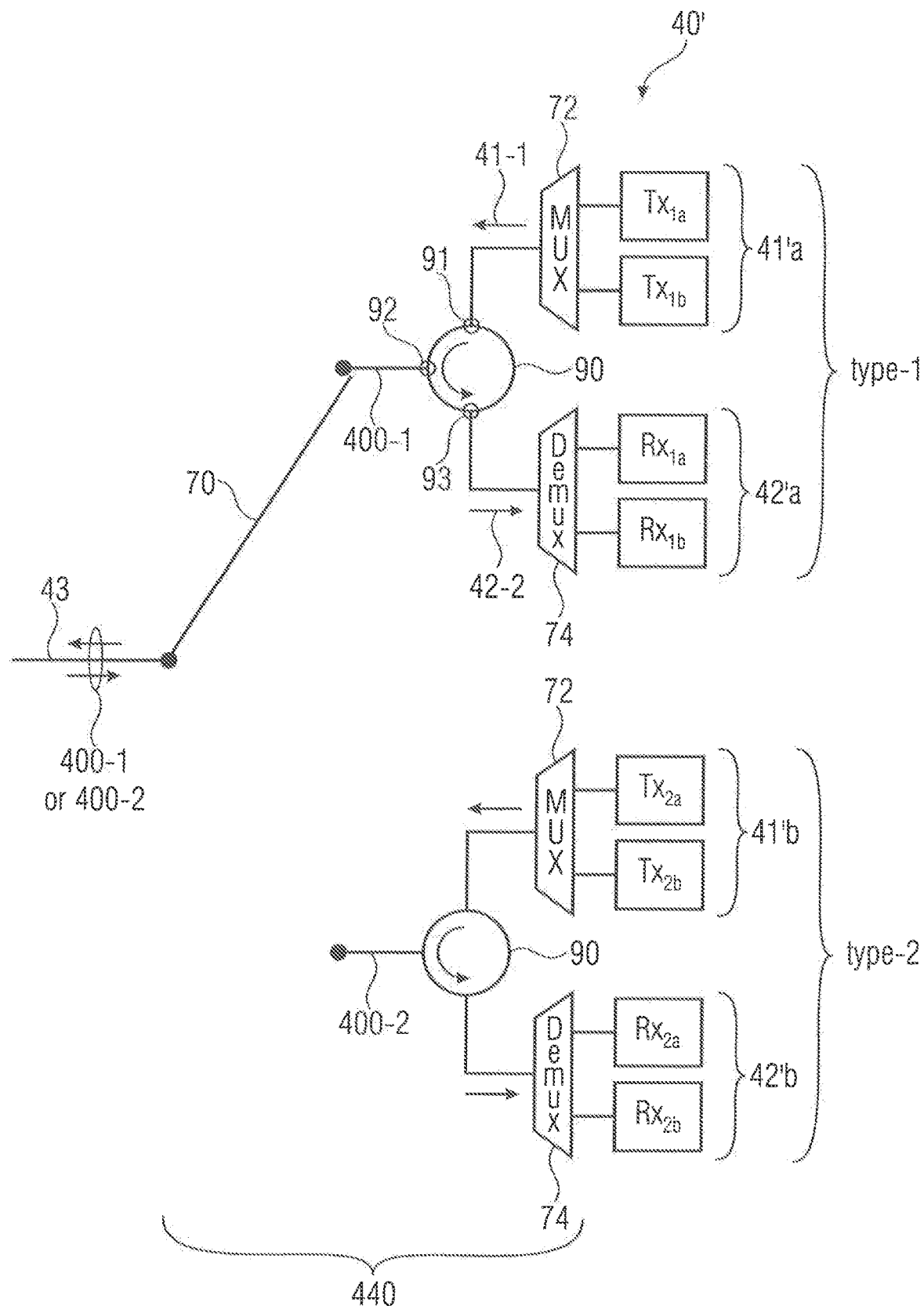
FIGS. 7-9 show components for an antenna according to examples above and/or below.
Figure 8:
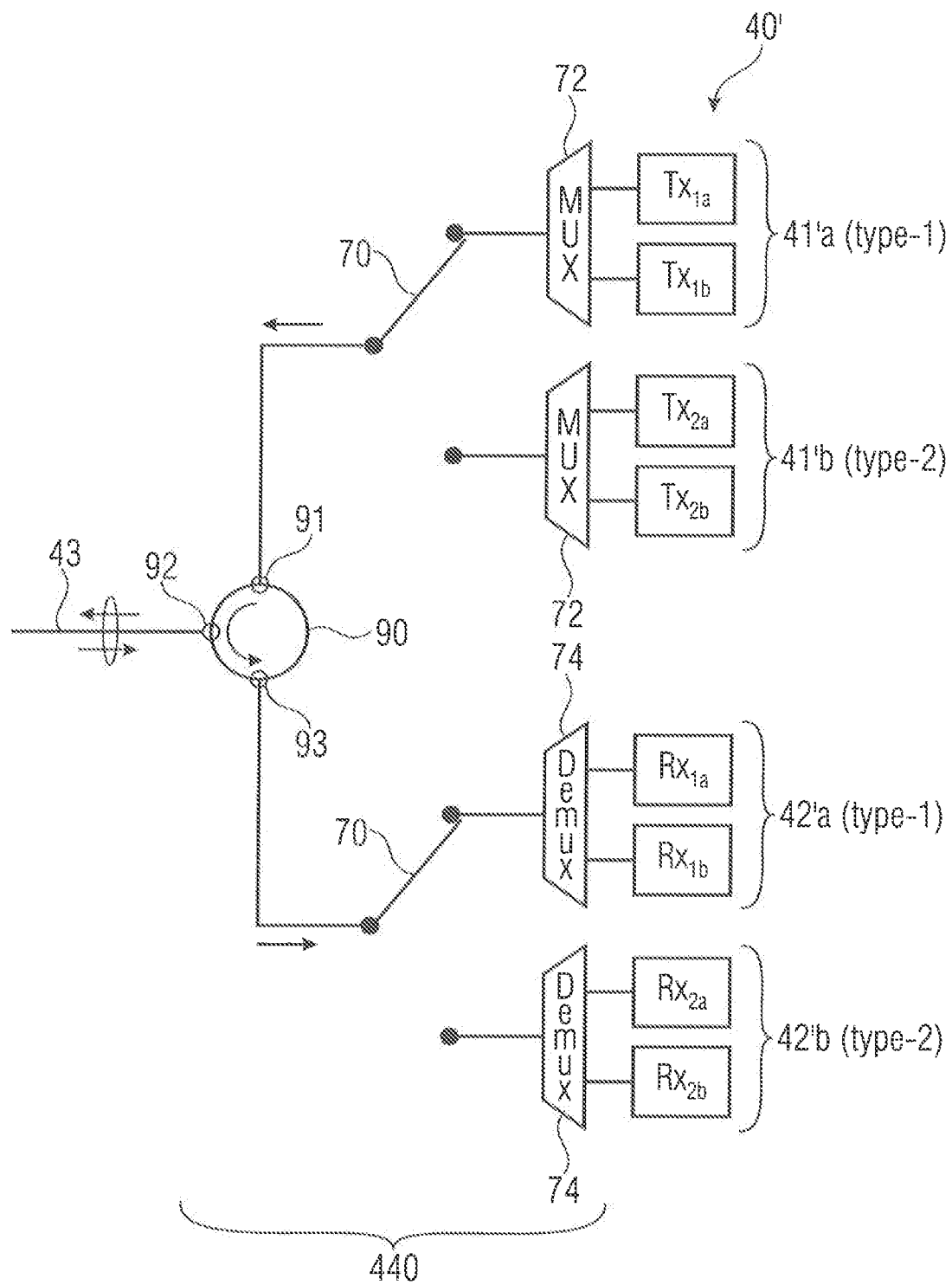
Figure 9:
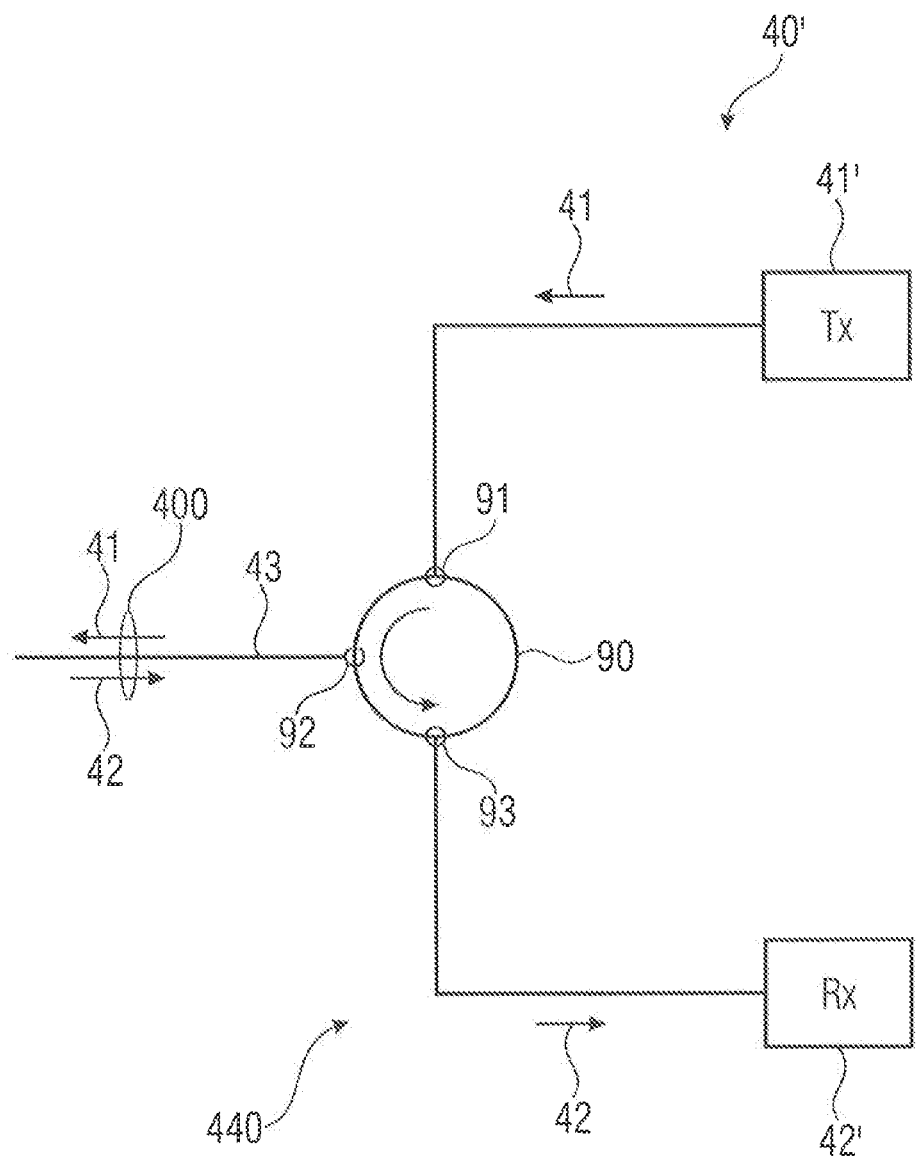

FIGS. 7-9 show examples of the proximal optical path 40. FIG. 9 shows a transmit source 41' and a receive Rx source 42' which are optically connected to the duplex bidirectional waveguide 43. As can be seen from FIG. 9, the duplex link 400 may be composed by the beams 41 and 42 in correspondence of a non-reciprocal optical element 90. The non-reciprocal optical element 90 may be, for example, an optical circulator. The non-reciprocal optical element 90 may be a device with a first connector 91, a second connector 92, and a third connector 93. A Tx beam input to the first connector 91 may be directed to the waveguide 43 through the second connector 92. An input for the waveguide 43 at the second connector 92 may be output through the third connector 93 towards the Rx receiver 42'.

Accordingly, it is possible to generate the bidirectional link 400 at the non-reciprocal optical element 90, so that the bidirectional link 400 is propagated and back-propagated through the bidirectional duplex waveguide 43. By virtue of the operation of the non-reciprocal optical element, the Tx beam 41 in the transmit direction and the Rx beam 42 in the receive direction may take one single angle of propagation through the waveguide 43. Hence, there is no need for a multi-mode waveguide. Therefore, a simple and straightforward, but highly performing, waveguide may be used.

Figure 2:
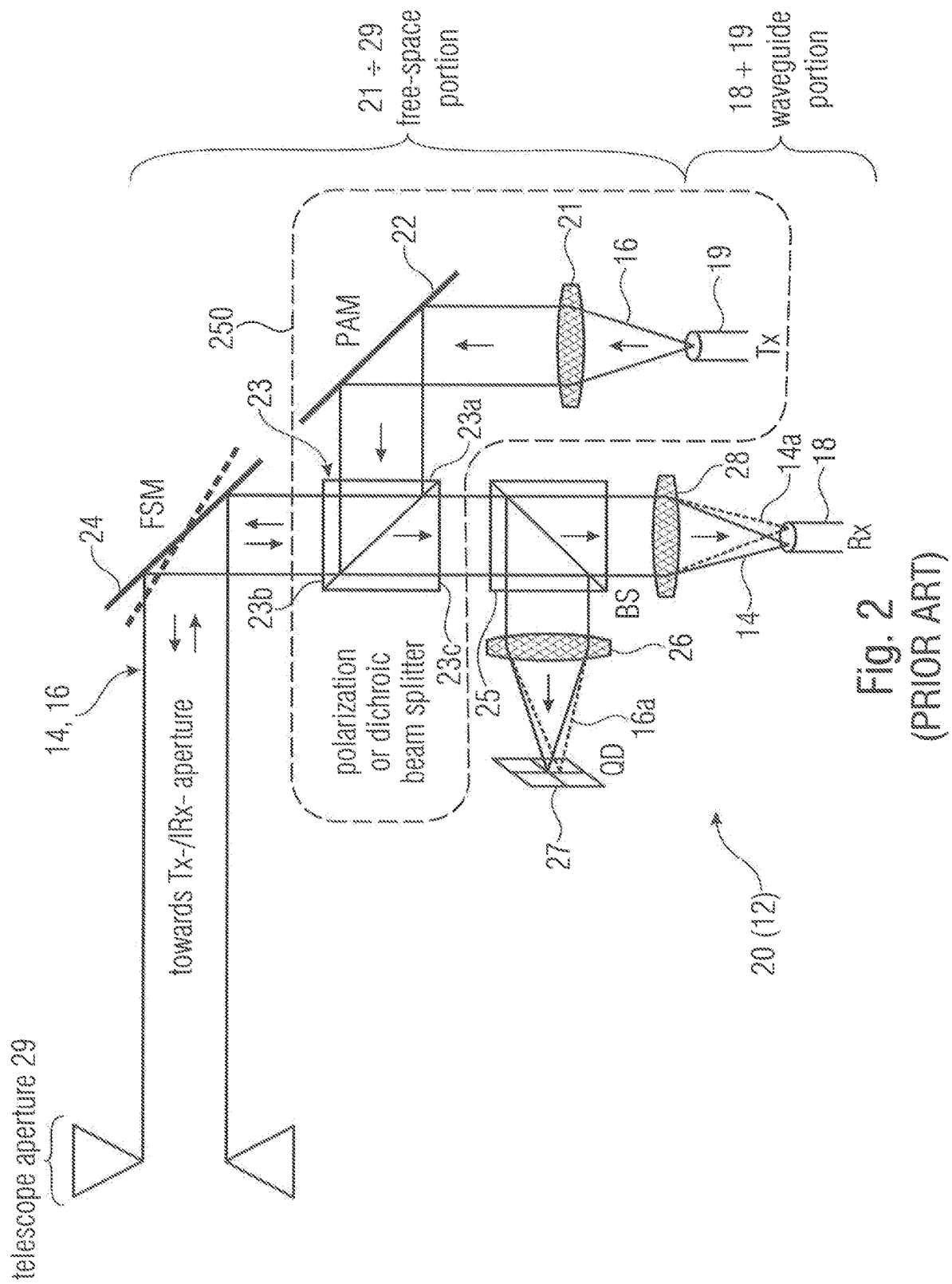
FIG. 2 shows an optical antenna according to conventional technology.

In comparison to the device of FIG. 2 (conventional technology), there is no need for both of the Rx waveguide 18 and Tx waveguide 19 and for the lenses 28 and 21. Further, in the waveguide 43 and in the subsequent distal optical path 40″, the duplex link 400 is truly bidirectional and single mode, as the rays do not take slightly different directions.

FIG. 7 shows an example of proximal optical path which permits to switch between a first mode and a second mode. For example it is possible to obtain an antenna operating either as a type-1 antenna or a type-2 antenna (the type-1 antenna having a first polarization or wavelength in transmission and a second polarization or wavelength in reception, and the type-2 antenna having the second polarization or wavelength in transmission and the first polarization or transmission in reception).

As can be seen from FIG. 7, an operation as type-1 or type-2 may be selected by using a simple and straightforward optical switch 70. The switch 70 may be, for example, obtained by using a laser switch. The type-1 mode may be obtained, for example, by using one or more Tx sources 41'a and/or one or more Rx receivers 42'a. A type-1 Tx beam 41-1 may be input at the first connector 91 of the non-reciprocal optical element 90 (e.g circulator) and transmitted to the waveguide 43 to contribute to the duplex link 400-1. The duplex link 400-1 may comprise, in back-propagation, an Rx beam 42-2 which may be directed in duplex way to the second connector 92 of the non-reciprocal optical element 90. The non-reciprocal optical element 90 may redirect the type-1 Rx beam 42-2 towards the at least one receiver 42'a. The type-2 operations may be obtained by switching the switch 70 to different, type-2 Tx sources 41'b and different, type-2 Rx receivers 42'b. If the switch 70 is switched towards the type-2 elements, a type-2 duplex link 400-2 would be propagated and back-propagated at the waveguide 43 and the distal optical path 40'. For example, the type-1 Tx sources 41'a may generate light at a first wavelength or polarization, while the type-2 Tx sources 41'b may generate light at a second wavelength or polarization. The same applies to the Rx sources 42'a and 42'b. In examples, the wavelength of the light generated by the sources 41'a may have the same polarization or wavelength of the light transmitted to the type-2 Rx receivers 42'b, while the light generated by the type-2 sources 41'b may have the same wavelength or polarization of the type-1 receivers 41'a.

Figure 3:
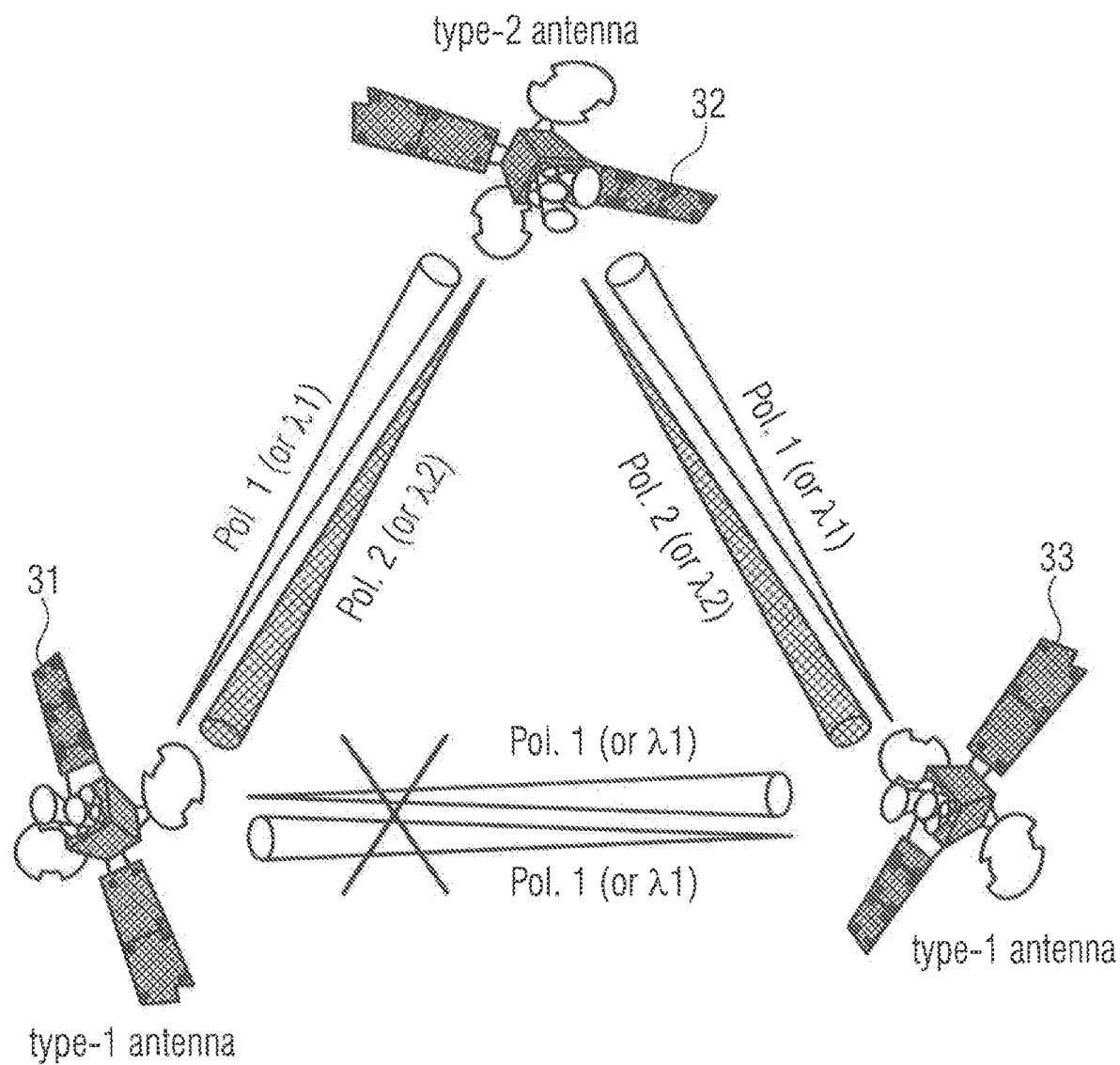
FIG. 3 shows a communication schema according to conventional technology.

Accordingly, operations such as those between the antennas 31 and 32 of FIG. 3 may be performed. However, contrary to conventional technology, there is no need for modifying the position of a beam splitter as in conventional technology (FIG. 2) and it is not necessary to use different polarization of dichroic BSs when it is useful to move from a type-1 mode to a type-2 mode. Instead of actuators switched to modify the position of the one or more beam splitters (FIG. 2), we simply have an optical switch 70 which may operate without mechanical complications and with acceptable reliability.

A variant of the example of FIG. 7 is provided by FIG. 8, in which one single circulator and two optical switches 70 are used. In the implementations, multiplexers 72 and demultiplexers 74 may be used, e.g. for composing light from a plurality of different sources and/or for providing light to different receivers, respectively.

Figure 12:
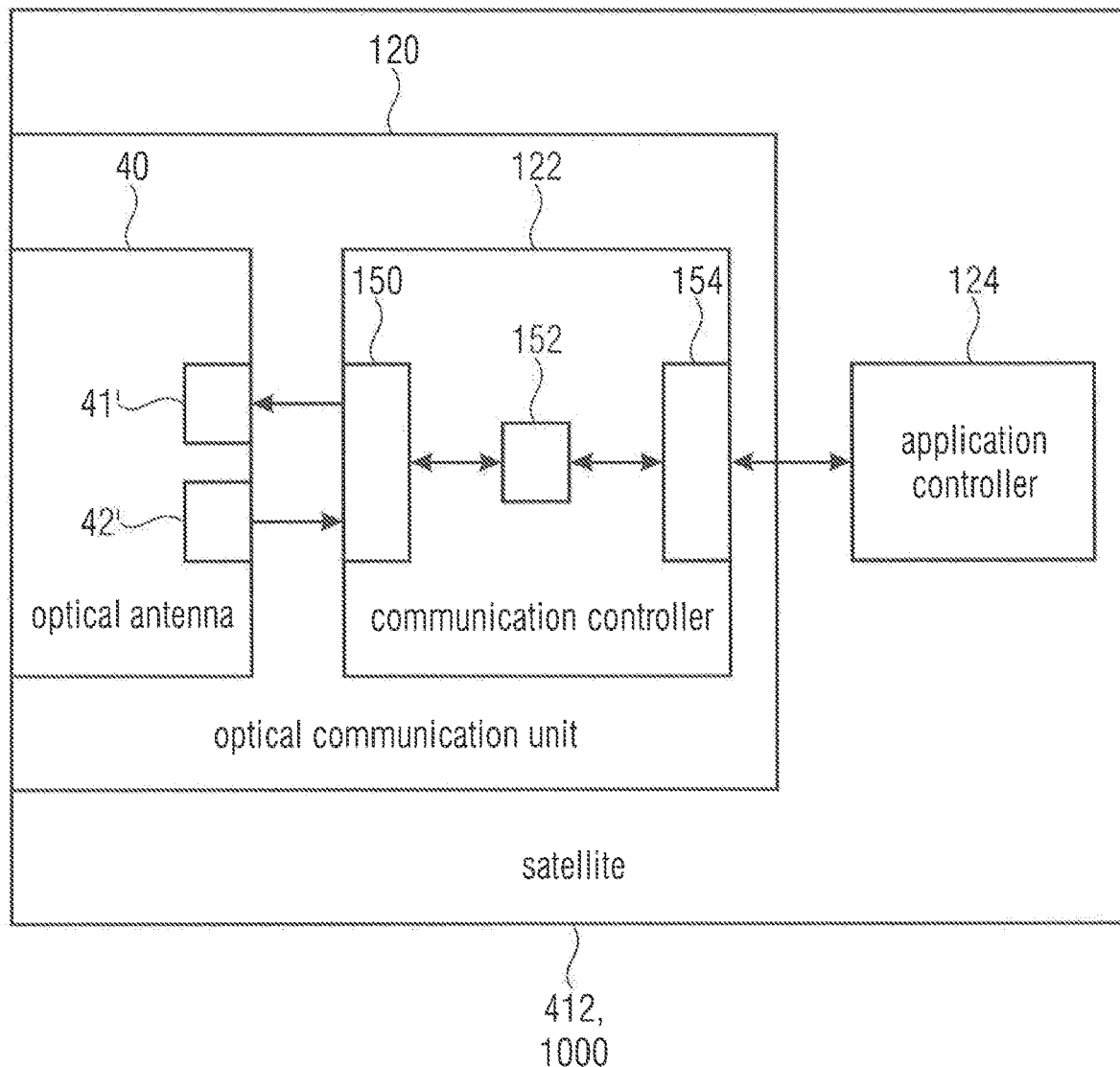
FIG. 12 shows a schematic view of a satellite according to examples above and/or below.

FIG. 12 shows a schematic view of a satellite 412 or 1000 on which the optical antenna 40 is mounted. The optical antenna 40 may be a part of an optical communication unit 120 whose task is to operate communications with partner antennas, for permitting an application controller 124 to exchange data with the application controller of a partner antenna. The communication controller 122 may be configured to control the at least one Tx source 41' to generate Tx beams 41 according to a bitstream to be communicated to the partner antenna. The communication controller 122 may be configured to decode a bitstream, received from the partner antenna, on the basis of light decoded by the at least one Rx receiver 42'. The communication controller 122 may comprise, for example, a control unit 152 whose task is to generate and receive bitstreams to be transmitted and/or received to and/or from the partner antenna. The control unit 152 may be associated, for example, to the Tx source(s) 41' and the Rx receiver(s) 42' by means of an input/output, I/O, unit 150. The I/O unit 150 controls the Tx sources 41' so as to generate light in a way that carries information valuable for an application controller associated to the patent antenna. The input/output unit 150 is configured to obtain information carried by the Rx beam 42 and received by the optical communication unit(s) 42'. The communication controller 122 may also comprise an application interface 154 to transmit a bitstream obtained by decoding the signals receivers 42' and/or to receive data to be transmitted in the form of the Tx beam 41'. The application controller 124, therefore, may request the transmission of data and may make use of data decoded by the communication controller 122.

The duplexing isolation of currently available circulators is about 60 dB. This isolation could be seen as not being enough for high-speed (e.g. 10 Gbit/s) bidirectional inter-satellite links, where polarization or wavelength filters would have to be added. For this purpose, the demultiplexers 74 may permit to operate as filters for this purpose. Circulators alone could provide the duplexing isolation that may be used for other optical links (e.g. with asymmetrical data rates).

However, even without filters, at bitrates of maximum than 1 Gbits/s, a proper duplex isolation is guaranteed.

In examples, and in particular when the waveguide 43 is a single-mode waveguide, it is possible to easily and reliably perform a setup mode and/or a pointing function. In fact, in case of PAA=0, the use of the single-mode waveguide 43 permits the Tx beam 41 and the Rx beam 42 to have a common path. Therefore, for reciprocity (when the partner antenna is configured as the antenna 40), the power of the Rx beam is the same of the power of the Tx beam, and it is possible to know that the partner antenna is receiving the Tx beam 41 at the same power at which the antenna 40 receives the Rx beam 42. When the Tx beam is therefore received at the setup mode or pointing function, the partner antenna is tracked (and the partner antenna has tracked the antenna 40).

The antenna 40 may therefore be configured to:
perform a pointing function and/or setup mode in which the Tx beam 41 is transmitted;
check the detection of the Rx beam 42 from the partner antenna;
determine the end of the pointing function and/or setup mode in case of detection of an Rx beam 42.

The antenna 40 may, in addition or alternative:
elongate or increase at least one dimension of the duplex propagation pattern of the duplex link 400 in case of absence of detection of the Rx beam 42; and/or
reduce at least one dimension or render uniform the duplex propagation pattern in case of detection of the Rx beam 42.

Figure 13:
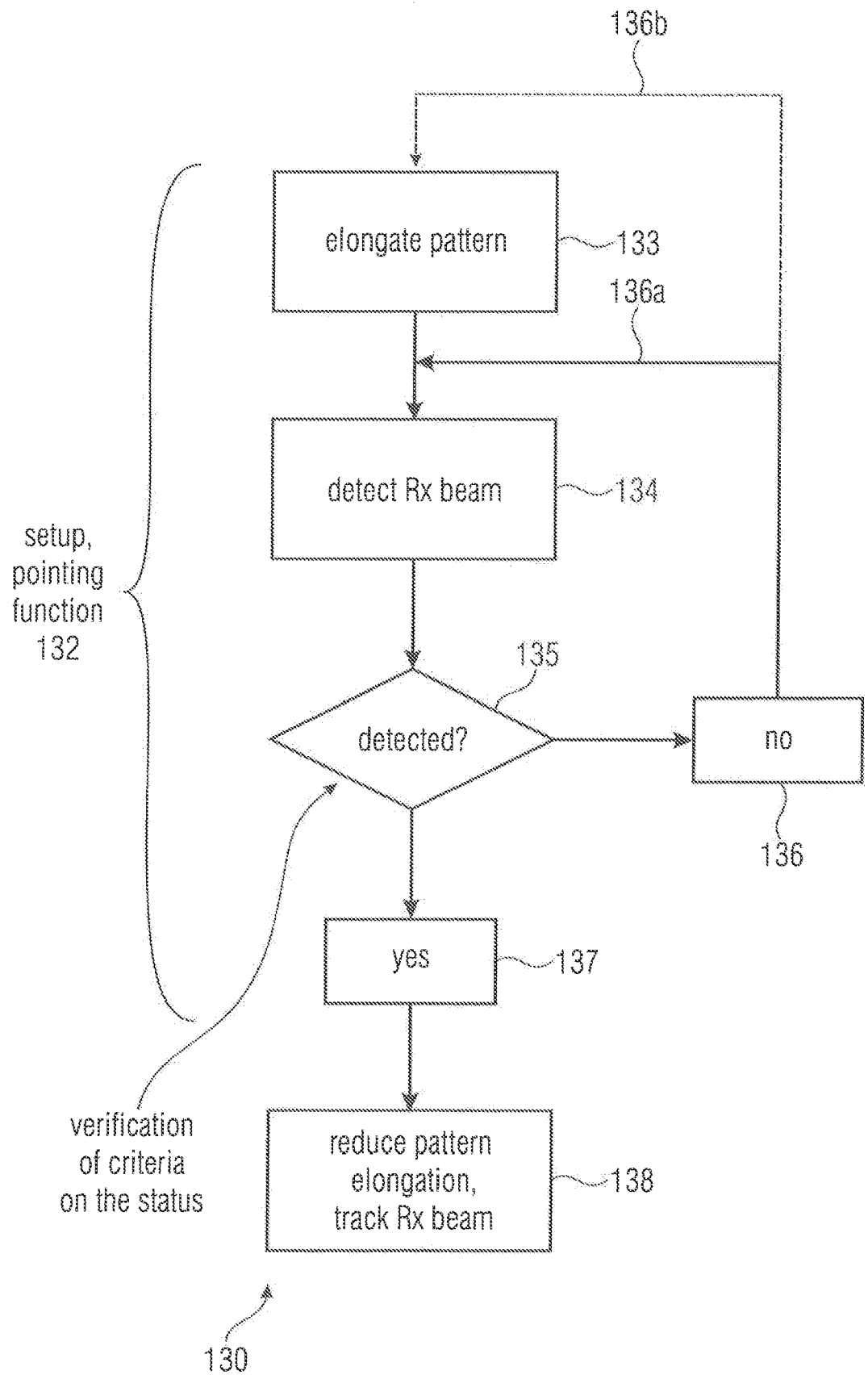
FIG. 13 shows an example of setup mode or pointing function.

An example of a method 130 is shown in FIG. 13. A setup or pointing function 132 may comprise, for example, a step 133 of elongating the pattern (e.g., to obtain the pattern 51) of the duplex link 400. At detection step 134, light is obtained by the receiver(s) 42'. At 135 it is verified whether the Rx beam 42 is obtained from the partner antenna: if no (136), the setup or pointing function is cycled by iteration 136a to reinitiate a new detection step 134. Alternatively, the iteration 136b reinitiates the step 133, to increase the elongation of the pattern of the duplex link 400 (e.g., to arrive at 51'). If at 135 it is acknowledged (137) that the Rx beam 42 is obtained (i.e., the partner antenna is in sight), at 138 elongation of the pattern is reduced (e.g., to 50, in case PAA=0, or to a less elongated pattern) and the Rx beam 42 is tracked.

Examples above refer to a method comprising:
controlling the shape of a duplex propagation pattern 50, 51 of a duplex link 400 for an optical antenna 40 to enclose:
a first partner antenna position 52 of a partner antenna at the instant of transmission of the Rx beam 42 of the duplex link 400; and
a second antenna position 53 of the partner antenna at the instant of reception of the Tx beam 41.

The method may further comprise:
adaptively shaping the duplex propagation pattern 50, 51 between:
a first pattern 50; and
a second pattern 51 different from the first pattern 50; and
modifying the duplex propagation pattern 50, 51 from the first pattern 50 to the second pattern 51 and/or vice versa on the basis of criteria on status of the optical antenna 40 and/or the partner optical antenna.

Examples above refer to a method comprising a method for a duplex link 400 formed by a transmit, Tx, beam 41 towards a partner optical antenna and a receive, Rx, beam 42 from the partner antenna, along:
a proximal optical path 40' including a bidirectional waveguide 43 for duplex propagation of the Tx beam 41 from at least one Tx source 41' and of the Rx beam 42 towards at least one receiver 42';
a distal duplex free-space optical path 40" for duplex propagation of the Tx beam 41 towards the partner optical antenna and the Rx beam 42 from the partner optical antenna;
wherein method comprises
directing, through a non-reciprocal optical element 90 including a first connector 91), a second connector 92), and a third connector 93):
light input from the first connector 91 to the second connector 92); and
light input from the second connector 92 to the third connector 93), wherein the first connector 91 is configured to receive the Tx beam 41 from at least one Tx source 41', the second connector 92 is optically communicating with the bidirectional waveguide 43, and the third connector 93 is configured to output the Rx beam 42.

It is also disclosed a non-transitory storage device storing instructions that, when executed by a processor, cause the processor to perform any of the steps of or any of the methods above and/or below and/or implement any of the components and/or any of the apparatus or systems below and/or above.

Depending on certain implementation requirements, examples may be implemented in hardware. The implementation may be performed using a digital storage medium, for example a floppy disk, a Digital Versatile Disc (DVD), a Blu-Ray Disc, a Compact Disc (CD), a Read-only Memory (ROM), a Programmable Read-only Memory (PROM), an Erasable and Programmable Read-only Memory (EPROM), an Electrically Erasable Programmable Read-Only Memory (EEPROM) or a flash memory, having electronically readable control signals stored thereon, which cooperate (or are capable of cooperating) with a programmable computer system such that the respective method is performed. Therefore, the digital storage medium may be computer readable.

Generally, examples may be implemented as a computer program product with program instructions, the program instructions being operative for performing one of the methods when the computer program product runs on a computer. The program instructions may for example be stored on a machine readable medium.

Other examples comprise the computer program for performing one of the methods described herein, stored on a machine readable carrier. In other words, an example of method is, therefore, a computer program having a program instructions for performing one of the methods described herein, when the computer program runs on a computer.

A further example of the methods is, therefore, a data carrier medium (or a digital storage medium, or a computer-readable medium) comprising, recorded thereon, the computer program for performing one of the methods described herein. The data carrier medium, the digital storage medium or the recorded medium are tangible and/or non-transitionary, rather than signals which are intangible and transitory.

A further example comprises a processing unit, for example a computer, or a programmable logic device performing one of the methods described herein.

A further example comprises a computer having installed thereon the computer program for performing one of the methods described herein.

A further example comprises an apparatus or a system transferring (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some examples, a programmable logic device (for example, a field programmable gate array) may be used to perform some or all of the functionalities of the methods described herein. In some examples, a field programmable gate array may cooperate with a microprocessor in order to perform one of the methods described herein. Generally, the methods may be performed by any appropriate hardware apparatus.

The above described examples are illustrative for the principles discussed above. It is understood that modifications and variations of the arrangements and the details described herein will be apparent. It is the intent, therefore, to be limited by the scope of the impending patent claims and not by the specific details presented by way of description and explanation of the examples herein.

6. DISCUSSION OF EXAMPLES 6.1 Context 6.1.1 Satellite Network

The context may be optical satellite communications. The focus may be on global satellite constellation, e.g., with many LEO satellites.

This disclosure concerns, inter alia to the design of a bidirectional optical antenna which takes account of the point-ahead angle (PAA).

Transmitter (Tx) and receiver (Rx) beams go through the common path of the antenna telescope. A design with two separate telescopes (and apertures) for Tx and Rx would be too expensive.

6.1.2 Point-Ahead Angle

Because of the relative movement of the partner satellite (or of the ground station for up/downlinks), the Tx may point the beam ahead of the Rx beam direction to ensure reception by the partner satellite (see FIG. 1). The point-ahead angle (PAA) is not constant and depends on the positions and speed vectors of the antennas. For LEO satellites, the PAA typically ranges between 0 and 80 μrad.

Optical satellite antennas for high-speed communication typically have a beam divergence of 5 to 20 μrad.

6.2 Discussion on Conventional Technology 6.2.1 Conventional Design

For the current state of the art, the point-ahead angle for duplex transmission is implemented by separating/combining the Tx and Rx beams in free-space, using either polarization or wavelength (dichroic) division. FIG. 2 shows a typical optical design. The Tx and Rx beams are referred to with 16 and 14 respectively. After the Rx beam is separated from the Tx beam path, the Rx beam power is generally split, one part being focused on the beam position sensor, another part being focused on the communication receiver. Rx beam separation is done by a simple beam splitter 25 (BS). The spot position sensor may be a camera or a quadrant detector (QD) 27 that provides a feedback to the fine steering mirror (FSM) 24 to correct the Rx beam direction.

The difference in the direction of the Tx and Rx beams is controlled by the point-ahead mirror PAM 22. The PAM position is driven by the known orbit parameters.

6.2.2 Limitations of the State of the Art

We mention here the large mechanical switches that may be used for inter-antenna compatibility. Additional improvements are discussed above and/or listed in § 6.3.2.

FIG. 3 shows a configuration where antennas have fixed division schemes for their duplexing, leading to antennas of "Type 1" and "Type 2" and leading to the impossibility of establishing links between antennas of the same type. For inter-antenna compatibility, the Tx/Rx wavelengths or polarizations may be swapped when a link with a different satellite is to be established.

The conventional design features a free-space duplexing BS 23 (e.g. a cube of 2-cm side) that may be mechanically replaced. This task is critical and the design is demanding.

6.3 Discussion on The Present Examples 6.3.1 Description

Each of the examples above and below comprise an optical antenna which may have one of the following combined properties:

1. Reciprocal optical free-space (antenna) path 40″ with a bidirectional waveguide (e.g. fiber)
2. A beam shaper 44 that elongates the beam 400 (41, 42) in the point-ahead direction
3. Duplexing and switching capabilities in single-mode waveguide 43.

The examples provide design simplicity and networking flexibility.

An example is depicted in FIG. 4*a*. A basic idea of the new point-ahead implementation is to make the free-space antenna path 40″ fully reciprocal by transmitting and receiving in the exact same (but opposite) directions FIG. 4*a*.

As depicted in FIG. 5*a*, the use of ellipses (or similar shapes) keeps the propagation losses low compared to a circular beam form. The implementation of two beams being both sent and both received with a variable direction separation would be useless and too technically challenging.

The beam shaping mechanism 44 proposed in FIG. 6 can perform adaptive elongation of the beam profile in the PAA direction. It comprises two cylindrical lenses of collecting type and dispersal type, respectively. The distance between the two cylindrical lenses can be varied and the two lenses together can be rotated. Both lenses can be fitted together yielding a plane glass plate, leaving a small circular beam.

FIG. 7 depicts implementation examples of the diagram box "duplexers, switches, filters and multiplexers" of FIG. 4*a*.

6.3.2 Discussion on Advantages
6.3.2.1 Single-Mode Waveguide Duplexing (Circulators Available)

In single-mode waveguides, the combining and separation of wavelengths and polarization is straightforward with standard components. More importantly, in single-mode waveguide, optical circulators are available. Multimode circulators, i.e. circulators for non-parallel beams (as when there is a PAA), are not available. Circulators are polarization- and wavelength-transparent. Therefore duplexing with circulators may not need polarization division or wavelength division and can free these resources.

The duplexing isolation of currently available circulators is about 60 dB. This isolation is not high enough for high-speed (e.g. 10 Gbit/s) bidirectional inter-satellite links, where polarization or wavelength filters would have to be added. However circulators alone could provide the duplexing isolation that may be used for other optical links (e.g. with asymmetrical data rates).

6.3.2.2 Single-Mode Waveguide Switching

With a waveguide-based duplexer, the switching of the antenna between Type-1 and Type-2 can be performed by only standard optical switches or simply by turning on or off some lasers. No large optical elements (e.g. beamsplitter cubes) need to be mechanically replaced.

6.3.2.3 Without PAA, the Bidirectional Single-Mode Provider (SMF) Provides Link Reciprocity When the PAA becomes negligible compared to the beam divergence, antenna reciprocity leads to link reciprocity which means that the coupling loss from Antenna A to Antenna B is the same as from Antenna B to antenna A. This property is very useful for initial antenna alignment.

An advantage of having a single fiber such as the waveguide 43 is that, in the absence of a point-ahead angle, the transmit and receive beams have a common path. Therefore, reciprocity of power transfer between transmitted and received beams is fully guaranteed.

6.3.2.4 Adaptiveness with Respect to Satellite Communication Channel
6.3.2.4.1 Easier Initial Pointing The elliptical or elongated beam, elongated in the PAA direction can overcome large pointing errors in the trajectory direction. During the initial link acquisition phase, the position of the counter-satellite is estimated from known orbit parameters and the beam is sent in the estimated direction. However, the satellite position error is in general larger in the trajectory direction, which is also the PAA direction. So, with an elongated beam that covers a wider position range, probability of mispointing is reduced.

6.3.2.4.2 Elliptical Divergence Adaptive to Variable PAA

To minimize the link loss, the elliptical beam profile can be adapted to the magnitude of the PAA.

6.3.2.4.3 Rare Cases of Too Large PAA (High Loss)

In a LEO satellite constellation, cases of large PAA occur when two LEO satellites cross each other (in opposite direction). These large-PAA cases can be subdivided into short links (satellites are side-by-side) and long links (where the beam at the link middle is close to the Earth). Short links have low free-space propagation loss and thus can afford large beam divergence (large ellipses).

So, demanding cases are only long links with crossing satellites. These demanding cases can be excluded without significantly decreasing the total network capacity.

6.3.3 Remark on Fine Tracking System

The Rx beam is detected as an elliptical spot beam. A quadrant detector can be used also to center elliptical beams. In order to offset the ellipse center and the fiber a variable offset can be implemented between the fiber position and the QD center.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

6.4 Acronyms
LEO Low Earth orbit
PAA Point-ahead angle
PAM Point-ahead mirror
QD Quadrant detector
BS Beam splitter
PBS Polarization BS
SMF Single-mode fiber 6.5 Characterization of Some Figures FIG. 1: Point-ahead angle as a result of a significant lateral satellite speed with respect to light speed FIG. 2: Conventional implementation of free-space duplexing with point-ahead angle implementation FIG. 3: For polarization-division duplexing, compatibility between any satellite antennas is guaranteed when the duplexer that splits polarizations can be changed on board the satellite FIG. 4*a* Waveguide-based duplexing and reciprocal antenna with beam shaper for point-ahead fulfilment FIG. 5*a* Possible radiation patterns of a reciprocal antenna.

FIG. 6: Beam shaper for elliptical beam

FIG. 7: Two examples of optical waveguide-based duplexing using circulators and switching between different types of Tx/Rx. The possibility of multiplexing is also shown, which can be using wavelength division or polarization division.

The invention claimed is:

1. An optical antenna for a duplex link formed by a transmit (Tx) beam towards a partner optical antenna and a receive (Rx) beam from the partner optical antenna, the duplex link involving a duplex propagation pattern for a duplex propagation of the Tx beam and the Rx beam, the optical antenna comprising:
   a proximal optical path comprising a bidirectional waveguide for a duplex propagation of the duplex link from at least one Tx source of the Tx beam and towards at least one receiver of the Rx beam;
   a distal duplex optical path for a duplex propagation of the duplex link from and towards the partner optical antenna;
   a beam shaper positioned in the distal duplex optical path to shape the duplex propagation pattern of the duplex link, wherein the beam shaper includes a first lens and a second lens which modify a shape of the Rx beam and of the Tx beam in a duplex way, wherein the first lens is a dispersing optical unit for the Tx beam and a collecting optical unit for the Rx beam, and the second lens is a collecting optical unit for the Tx beam and a dispersing optical unit for the Rx beam, wherein a relative distance between the first lens and the second lens along an optical axis controls an elongation of the duplex propagation pattern; and
   a controller configured to control the beam shaper to adaptively shape the duplex propagation pattern to enclose:
      a first partner antenna position of the partner optical antenna at an instant of transmission of the Rx beam; and
      a second antenna position of the partner optical antenna at an instant of reception of the Tx beam,
   wherein the controller is configured, by controlling the relative distance between the first lens and the second lens, to adaptively shape the duplex propagation pattern between:
      a first pattern; and
      a second pattern different from the first pattern,
   wherein the controller is configured to modify the duplex propagation pattern from the first pattern to the second pattern and vice versa based on criteria on status of the optical antenna and the partner optical antenna,
   wherein the controller is configured to base the criteria at least on a point-ahead angle (PAA) between the optical antenna and the partner optical antenna, so as to be conditioned towards modifying the duplex propagation pattern:
      from the first pattern to the second pattern when the PAA is increased, to increase the elongation of the duplex propagation pattern in a direction of increase of the PAA, and
      from the second pattern to the first pattern when the PAA is reduced, to reduce the elongation of the duplex propagation pattern.

2. The optical antenna of claim 1, wherein the controller is configured to adaptively shape the duplex propagation pattern so that an area of the second pattern is greater than an area of the first pattern.

3. The optical antenna of claim 1, wherein the controller is configured to adaptively shape the duplex propagation pattern so that at least one dimension of the second pattern is greater than a dimension of the first pattern.

4. The optical antenna of claim 1, wherein the controller is configured to adaptively shape the duplex propagation pattern so that the second pattern is more elongated than the first pattern.

5. The optical antenna of claim 1, wherein the controller is configured to base the criteria at least on a probability of localizing the partner antenna, so as to be conditioned towards modifying the duplex propagation pattern:
   from the second pattern to the first pattern when the probability of localizing the partner antenna is increased, and
   from the first pattern to the second pattern when the probability of localizing the partner antenna is reduced,
   so as to elongate the duplex propagation pattern in case of reduced probability of localizing the partner antenna; and
   so as to reduce the elongation of the duplex propagation pattern in case of increased probability of localizing the partner antenna.

6. The optical antenna of claim 1, wherein the controller is configured to perform an initial pointing, in which positions of the partner antenna are estimated from known orbit parameters, so as to elongate the duplex propagation pattern during the initial pointing, and to subsequently reduce the elongation of the duplex propagation pattern after the initial pointing.

7. The optical antenna of claim 1, wherein the controller is configured to shape the duplex propagation pattern to be more elongated in a direction of increase or decrease of the PAA.

8. The optical antenna of claim 1, wherein the controller is configured to shape the duplex propagation pattern to exhibit an elliptical shape, a major axis of the elliptical shape being parallel or adjacent to a distance between the first partner antenna position and the second partner antenna position.

9. The optical antenna of claim 1, wherein the controller is configured to shape the duplex propagation pattern to exhibit a circular shape in case of the PAA being smaller than a predetermined threshold.

10. The optical antenna of claim 1,
    wherein the beam shaper is configured to modify the relative distance between the first lens and the second lens under control of the controller to elongate a shape of the duplex propagation pattern.

11. The optical antenna of claim 1,
    wherein at least one of the first lens and the second lens is a cylindrical lens.

12. The optical antenna of claim 1, wherein the beam shaper comprises at least one rotatable optical unit with a non-circularly-symmetric shape adapted to modify the duplex propagation pattern in accordance with an orientation of the at least one rotatable optical unit,
    wherein the beam shaper is configured to rotate the at least one rotatable optical unit under control of the controller to modify a shape and/or orientation of the duplex propagation pattern.

13. The optical antenna of claim 1, wherein the beam shaper comprises at least one rotatable optical unit with a non-circularly-symmetric shape adapted to modify the duplex propagation pattern in accordance with an orientation of the at least one rotatable optical unit,
    wherein the beam shaper is configured to rotate the at least one rotatable optical unit under control of the controller to rotate the duplex propagation pattern.

14. The optical antenna of claim 1, wherein the beam shaper is placed before an attachment to an external telescope.

15. The optical antenna of claim 1, wherein the waveguide is a single-mode waveguide.

16. The optical antenna of claim 1, wherein the proximal waveguide path comprises a non-reciprocal optical element comprising a first connector, a second connector, and a third connector, so as to direct:
   light input from the first connector to the second connector; and
   light input from the second connector to the third connector,
   wherein the first connector is configured to receive the Tx beam from at least one Tx source, the second connector is optically communicating with the bidirectional waveguide, and the third connector is configured to output the Rx beam.

17. The optical antenna of claim 16, wherein the non-reciprocal optical element is a circulator.

18. A method by an optical antenna for a duplex link formed by a transmit (Tx) beam towards a partner optical antenna and a receive (Rx) beam from the partner optical antenna, the duplex link involving a duplex propagation pattern for a duplex propagation of the Tx beam and the Rx beam, the method comprising:
   controlling a shape of the duplex propagation pattern of the duplex link for an optical antenna to enclose:
      a first partner antenna position of the partner optical antenna at an instant of transmission of the Rx beam of the duplex link; and
      a second antenna position of the partner optical antenna at an instant of reception of the Tx beam,
   the method further comprising:
   adaptively shaping the duplex propagation pattern between:
      a first pattern; and
      a second pattern different from the first pattern; and
   modifying the duplex propagation pattern from the first pattern to the second pattern or vice versa based on criteria on status of the optical antenna and the partner optical antenna, wherein the modifying uses a beam shaper positioned in a distal optical path to shape the duplex propagation pattern of the duplex link, wherein the beam shaper includes a first lens and a second lens which modify a shape of the Rx beam and of the Tx beam in a duplex way, wherein the first lens is a dispersing optical unit for the Tx beam and a collecting optical unit for the Rx beam, and the second lens is a collecting optical unit for the Tx beam and a dispersing optical unit for the Rx beam, wherein a relative distance between the first lens and the second lens along an optical axis controls an elongation of the duplex propagation pattern.

19. A non-transitory digital storage medium having a computer program stored thereon to perform a method by an optical antenna for a duplex link formed by a transmit (Tx) beam towards a partner optical antenna and a receive (Rx) beam from the partner optical antenna, the duplex link involving a duplex propagation pattern for a duplex propagation of the Tx beam and the Rx beam, the method comprising:
   controlling a shape of the duplex propagation pattern of the duplex link for an optical antenna to enclose:
      a first partner antenna position of the partner optical antenna at an instant of transmission of the Rx beam of the duplex link; and
      a second antenna position of the partner optical antenna at an instant of reception of the Tx beam,
   the method further comprising:
   adaptively shaping the duplex propagation pattern between:
      a first pattern; and
      a second pattern different from the first pattern; and
   modifying the duplex propagation pattern from the first pattern to the second pattern or vice versa based on criteria on status of the optical antenna and the partner optical antenna, wherein the modifying uses a beam shaper positioned in a distal optical path to shape the duplex propagation pattern of the duplex link, wherein the beam shaper includes a first lens and a second lens which both modify a shape of the Rx beam and of the Tx beam in a duplex way, wherein the first lens is a dispersing optical unit for the Tx beam and a collecting optical unit for the Rx beam, and the second lens is a collecting optical unit for the Tx beam and a dispersing optical unit for the Rx beam, wherein a relative distance between the first lens and the second lens along an optical axis controls an elongation of the duplex propagation pattern,
when the computer program is run by a computer.

* * * * *